United States Patent [19]

Nagai et al.

[11] Patent Number: 5,785,359
[45] Date of Patent: Jul. 28, 1998

[54] JOINT MECHANISM FOR STRUCTURAL MEMBERS

[75] Inventors: Shigekazu Nagai; Koji Sugano; Hiroyuki Shiomi, all of Ibaraki-ken; Takeshi Nagai, Tokyo, all of Japan

[73] Assignee: SMC Kabushiki Kaisha, Tokyo, Japan

[21] Appl. No.: 964,314

[22] PCT Filed: Jul. 6, 1994

[86] PCT No.: PCT/JP94/01098

§ 371 Date: Jan. 11, 1996

§ 102(e) Date: Jan. 11, 1996

[87] PCT Pub. No.: WO95/02128

PCT Pub. Date: Jan. 19, 1995

Related U.S. Application Data

[63] Continuation of Ser. No. 569,129, Jan. 11, 1996, abandoned.

[30] Foreign Application Priority Data

| Jul. 7, 1993 | [JP] | Japan | 5-168232 |
| Jul. 7, 1993 | [JP] | Japan | 5-168233 |
| Jul. 7, 1993 | [JP] | Japan | 5-168235 |

[51] Int. Cl.$^6$ .................................................. F16L 5/02
[52] U.S. Cl. ........................ 285/191; 285/325; 285/906; 403/255
[58] Field of Search .................................... 285/150, 325, 285/191, 906; 403/255

[56] References Cited

U.S. PATENT DOCUMENTS

| 3,538,940 | 11/1970 | Graham | 285/150 X |
| 3,560,027 | 2/1971 | Graham | 285/150 |
| 3,934,605 | 1/1976 | Legris | 285/325 X |
| 4,518,033 | 5/1985 | Gartner | 285/191 X |
| 5,090,740 | 2/1992 | Creager et al. | 285/150 X |
| 5,192,145 | 3/1993 | Rixen et al. | 403/255 |

FOREIGN PATENT DOCUMENTS

| 87 04 548 | 9/1988 | Germany |
| 5-69352 | 3/1993 | Japan |
| 5-180295 | 7/1993 | Japan |
| 5-180296 | 7/1993 | Japan |
| 5-180297 | 7/1993 | Japan |
| WO 92/21886 | 12/1992 | WIPO |
| WO 93/17248 | 9/1993 | WIPO |
| WO 94/18404 | 8/1994 | WIPO |

*Primary Examiner*—Dave W. Arola
*Attorney, Agent, or Firm*—Oblon, Spivak, McClelland, Maier & Neustadt, P.C.

[57] ABSTRACT

A passage communication member is fitted in a first passage in a structural member, and has a head which is mounted in a slot in another structural member. The first passage in the structural member and a passage in the other structural member are held in communication with each other through a through hole that is defined in the passage communication member. Alternatively, a first engaging member is inserted in a recess defined in a structural member, and a second engaging member is retained in a slot in another structural member. When the first and second engaging members are coupled to each other by a fastening member, the structural members are firmly joined and fixed to each other.

8 Claims, 28 Drawing Sheets

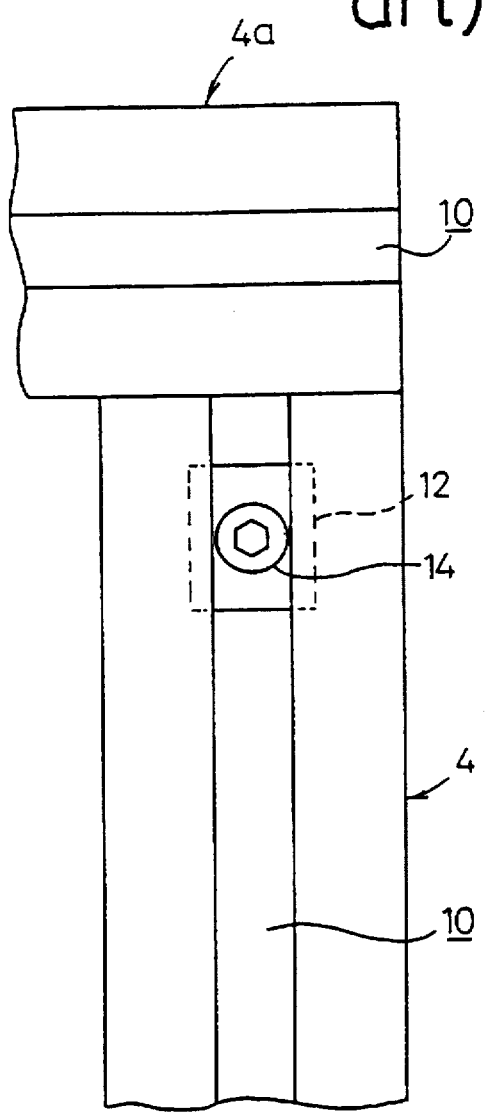
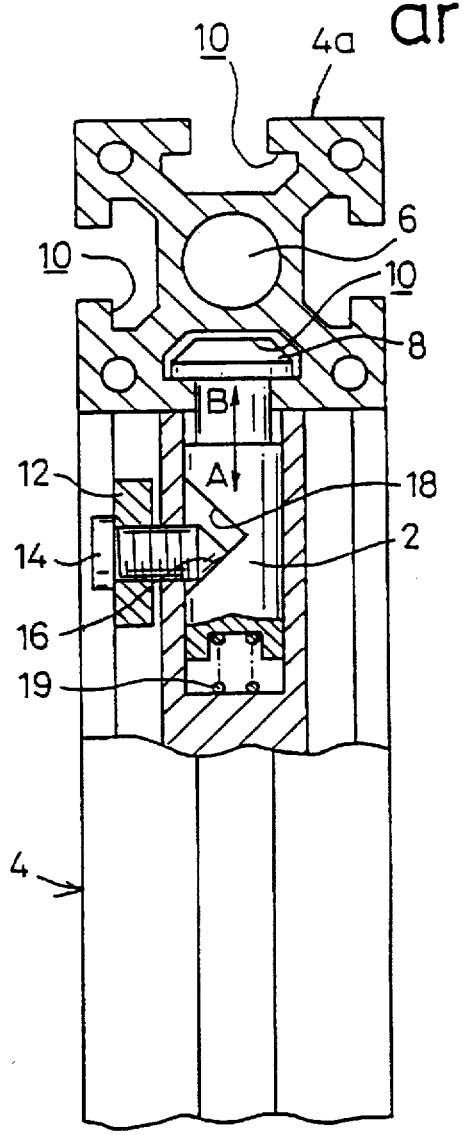

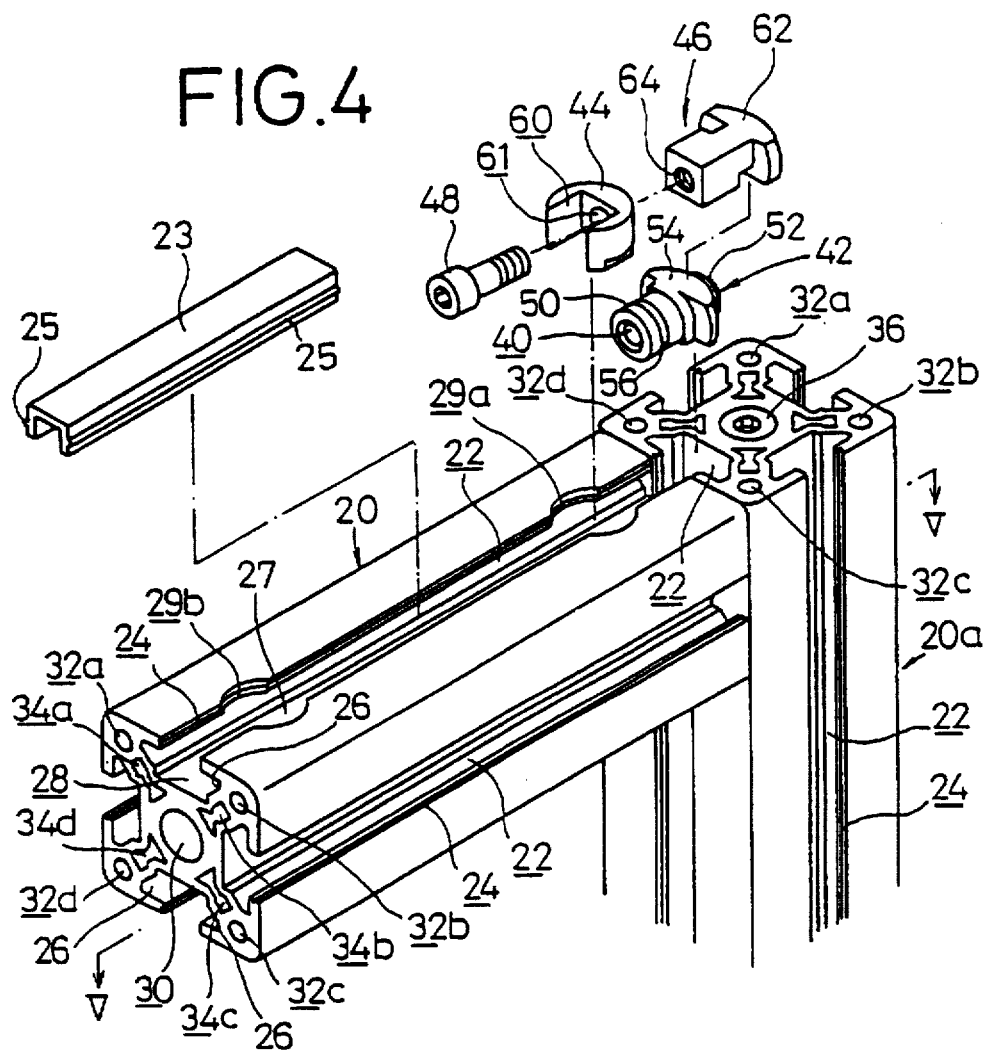

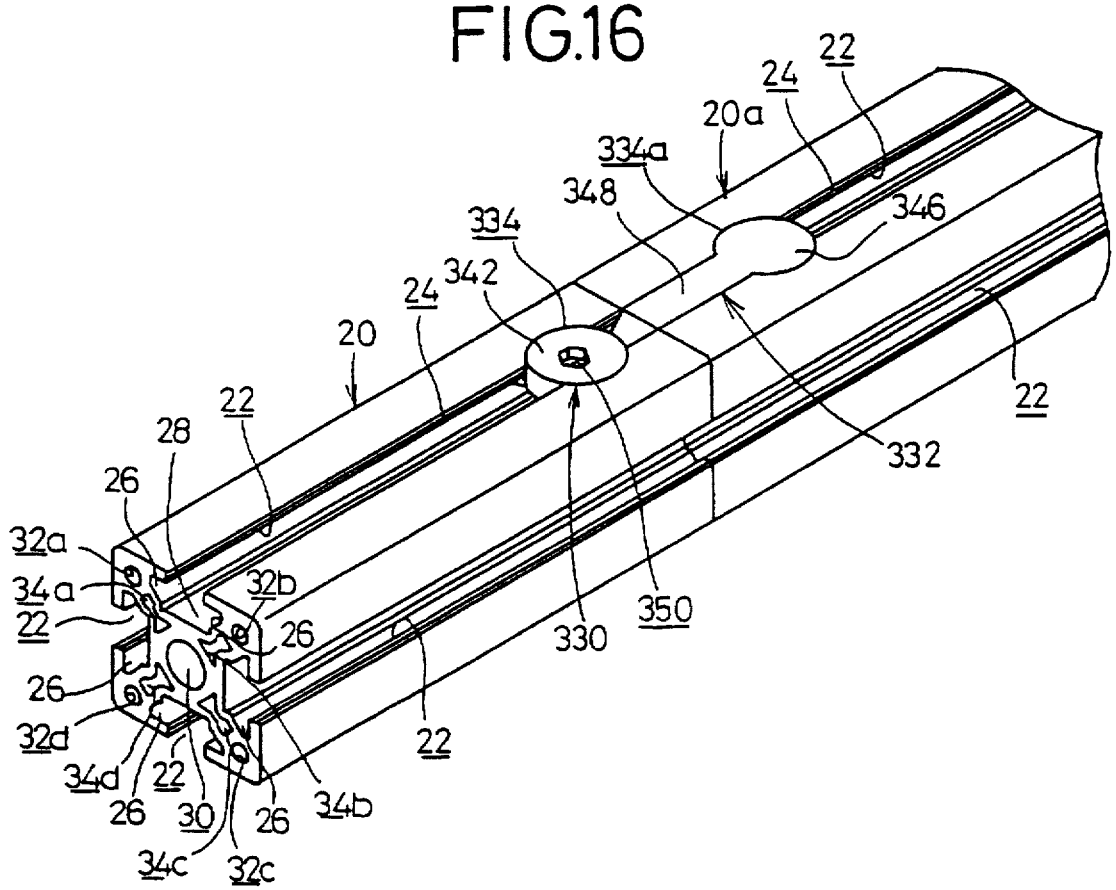

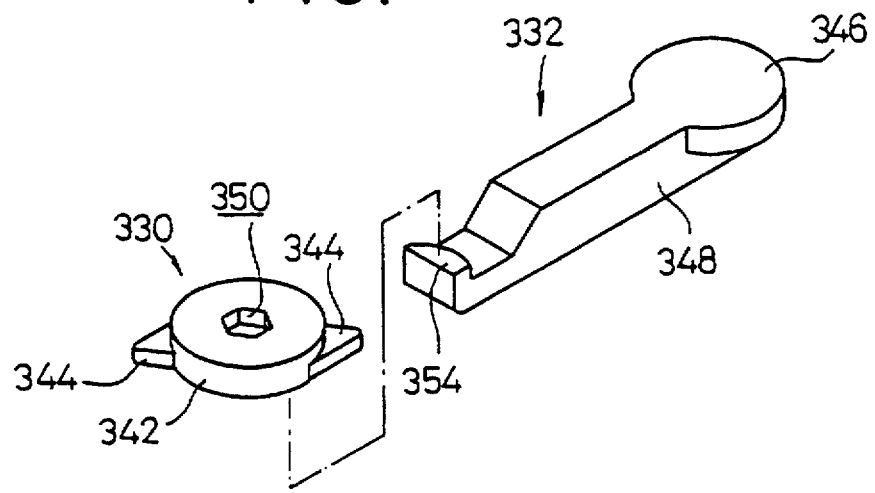
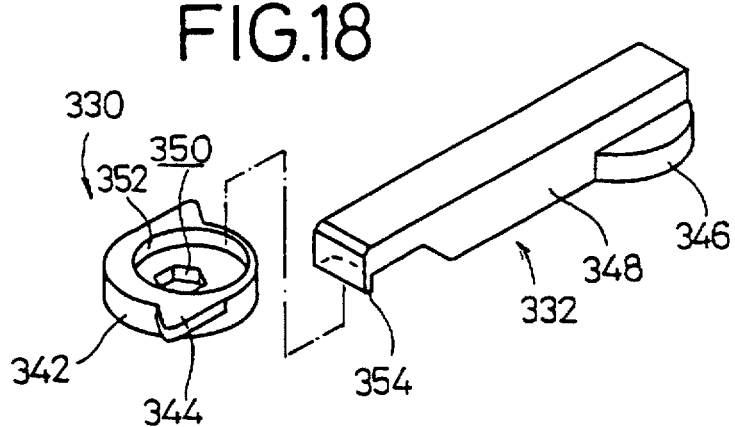

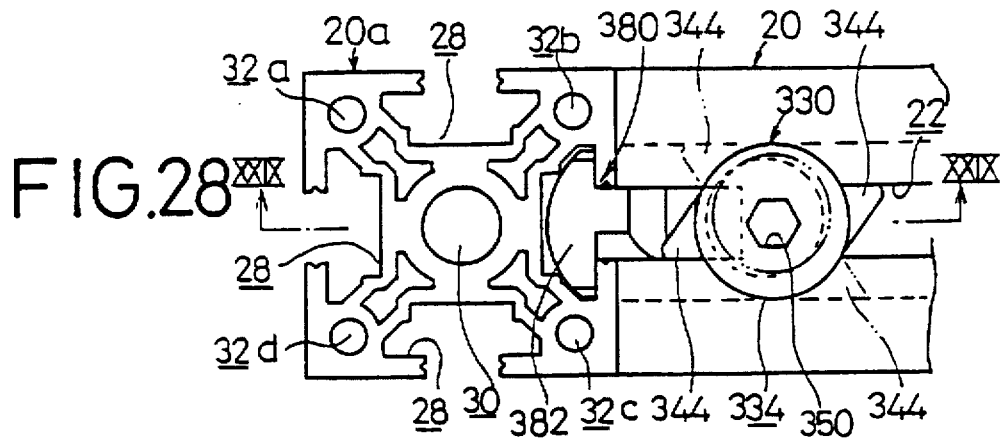

JOINT MECHANISM FOR STRUCTURAL MEMBERS

This application is a Continuation of application Ser. No. 08/569,129, filed on Jan. 11, 1996, now abandoned, which was filed as PCT application PCT/JP94/01098 on Jul. 6, 1994.

TECHNICAL FIELD

The present invention relates to a joint mechanism for joining structural members while keeping passages defined in the structural members in communication with each other when the structural members are to be assembled into a structural assembly.

BACKGROUND ART

The applicant of the present application has proposed an actuator which includes a drive means such as a motor or the like and a movable member that is displaceable by the drive means, the drive means and the movable member being accommodated in a recess in a structural member which comprises a substantially elongate columnar body, and also proposed a structural assembly (Japanese laid-open patent publications Nos. 5-69352, 5-180295, 5-180296, and 5-180297). In the proposal, there has been used a term "structural member" which represents a concept including both an outer frame of an actuator and a columnar elongate member. The term will be used below as meaning the same concept.

According to the technical ideas disclosed in the above publications, a plurality of structural members which are of substantially the same shape may be assembled by joint mechanisms into a structural assembly that has a desired function.

One example of the joint mechanisms disclosed in the above publications is a locking member 2 for joining structural members as shown in FIG. 1 of the accompanying drawings. As shown in FIG. 1, one end of the locking member 2 is inserted into a hole 6 defined longitudinally in a structural member 4, and a head 8 on the other end of the locking member 2 is loosely fitted in a slot 10 defined in another structural member 4a. Then, a screw 14 is threaded through a plate 12 transversely into the structural member 4 until a tip end 16 of the screw 14 is held against a slanting surface 18 of a notch defined substantially centrally in the locking member 2. The tip end 16 is of such a tapered configuration that when the screw 14 is threaded in, the tip end 16 presses the slanting surface 18, displacing the locking member 2 in the direction indicated by the arrow A in FIG. 3 of the accompanying drawings. When the locking member 2 is displaced in the direction indicated by the arrow A, the head 8 of the locking member 2 pulls an inner wall surface of the other structural member 4a also in the direction indicated by the arrow A. As a result, the structural members 4, 4a are fixedly joined to each other substantially perpendicularly to each other as shown in FIGS. 2 and 3 of the accompanying drawings. The locking member 2 is normally biased in the direction indicated by the arrow B under resilient forces from a spring 19.

The present invention has been made in relation to the above proposals. It is an object of the present invention to provide an improved joint mechanism for joining structural members while keeping passages defined in the structural members in communication with each other.

Another object of the present invention is to provide a joint mechanism which joins structural members substantially in line or perpendicularly through slots defined longitudinally in the structural members, so that a structural assembly can simply be constructed of the joined structural members.

Still another object of the present invention is to provide a joint mechanism which is capable of joining structural members angularly movably to each other at a freely selected angle between the joined structural members.

DISCLOSURE OF THE INVENTION

With a joint mechanism for joining structural members according to the present invention, a passage communication member is fitted in a passage in one of the structural members, and has a head which is mounted in a slot in the other of the structural members. The passage in one of the structural members and a passage in the other of the structural members are held in communication with each other through a through hole that is defined in the passage communication member. Alternatively, a first engaging member is inserted in a recess defined in one of the structural members, and a second engaging member is retained in a slot in the other of the structural members. When the first and second engaging members are coupled to each other by a fastening member, the structural members are firmly joined and fixed to each other.

BRIEF DESCRIPTION OF THE DRAWINGS

FIG. 2 is a side elevational view of structural members that are fixed to each other by the joint mechanism shown in FIG. 1;

FIG. 3 is a vertical longitudinal cross-sectional view of the joint mechanism shown in FIG. 2;

FIG. 4 is an exploded perspective view of structural members which are joined to each other by a joint mechanism according to an embodiment of the present invention;

FIG. 16 is a perspective view of structural members which are joined to each other by a joint mechanism according to yet still another embodiment of the present invention;

FIG. 17 is an exploded perspective view of the joint mechanism shown in FIG. 16;

FIG. 18 is an exploded perspective view of the joint mechanism, as viewed from behind, shown in FIG. 17;

FIG. 28 is a side elevational view of structural members which are joined to each other by the joint mechanism according to the embodiment shown in FIG. 26;

FIG. 29 is a cross-sectional view taken along line XXIX—XXIX of FIG. 28;

FIG. 30 is a vertical cross-sectional view of the joint mechanism shown in FIG. 29 as it is tightened;

BEST MODE FOR CARRYING OUT THE INVENTION

Figure 1:
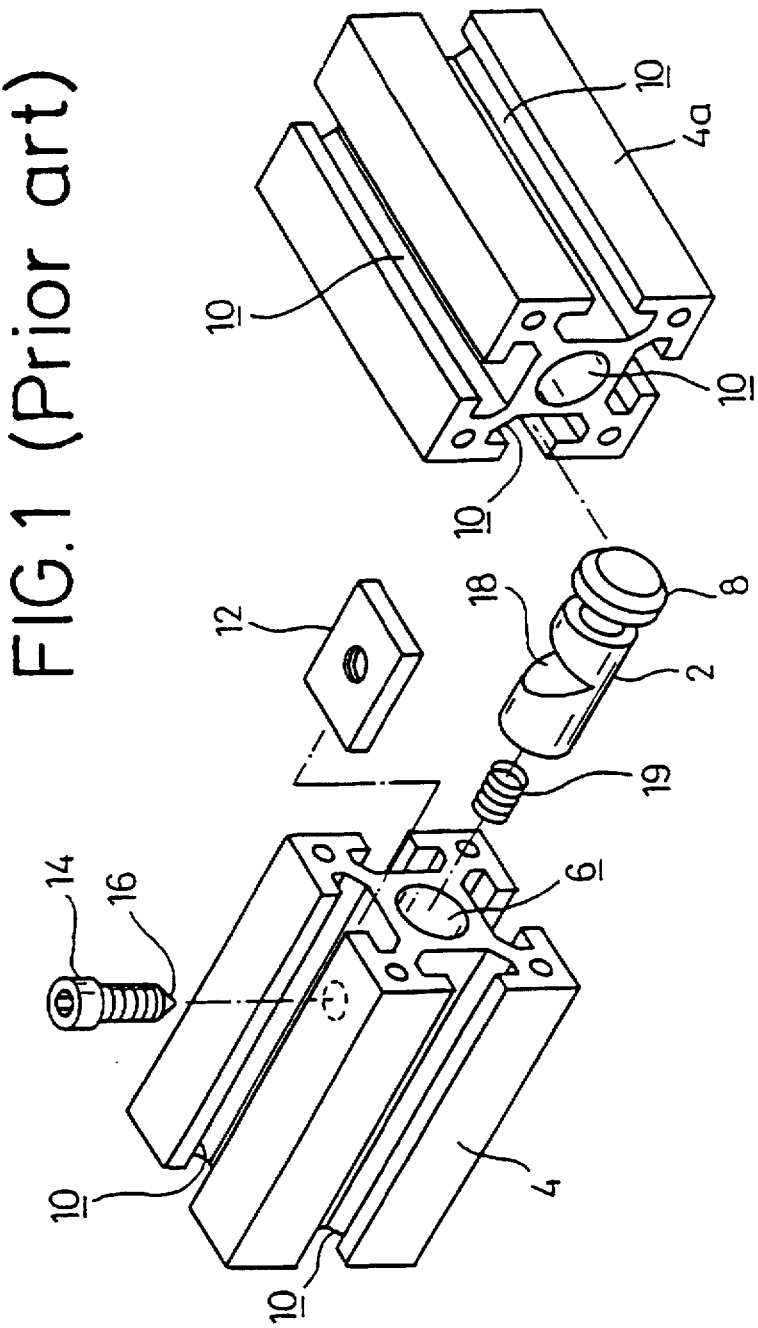
FIG. 1 is an exploded perspective view of a conventional joint mechanism for joining structural members.

Embodiments of the present invention will be described below in detail with reference to the accompanying drawings.

As shown in FIG. 4, structural members 20, 20a are in the form of substantially identical, elongate columnar bodies. The structural member 20 has substantially identical slots 22 of substantially T-shaped cross section which are defined respectively in outer side surfaces thereof. Since the structural members 20, 20a are substantially identical to each other in structure, the structural member 20 will be described below, and the structural member 20a will not be described below.

Each of the slots 22 has inlet edges which have respective substantially V-shaped grooves 24 defined therein that extend along the slot 22. A substantially channel-shaped cover 23 is mounted in the slot 22 with teeth 25 of the cover 23 engaging in the respective V-shaped grooves 24. Each of the slots 22 has an enlarged portion 26 which is spread from the inlet edges in directions perpendicular to the axis of the structural member 20, and a cavity 28 which is constricted inwardly from the enlarged portion 26 and extends to a flat bottom 27. The structural member 20 also has a pair of substantially circular recesses 29a, 29b (mounting recesses) defined in its upper surface closely to respective opposite ends thereof and communicating with the slot 22 in the upper surface.

Figure 5:
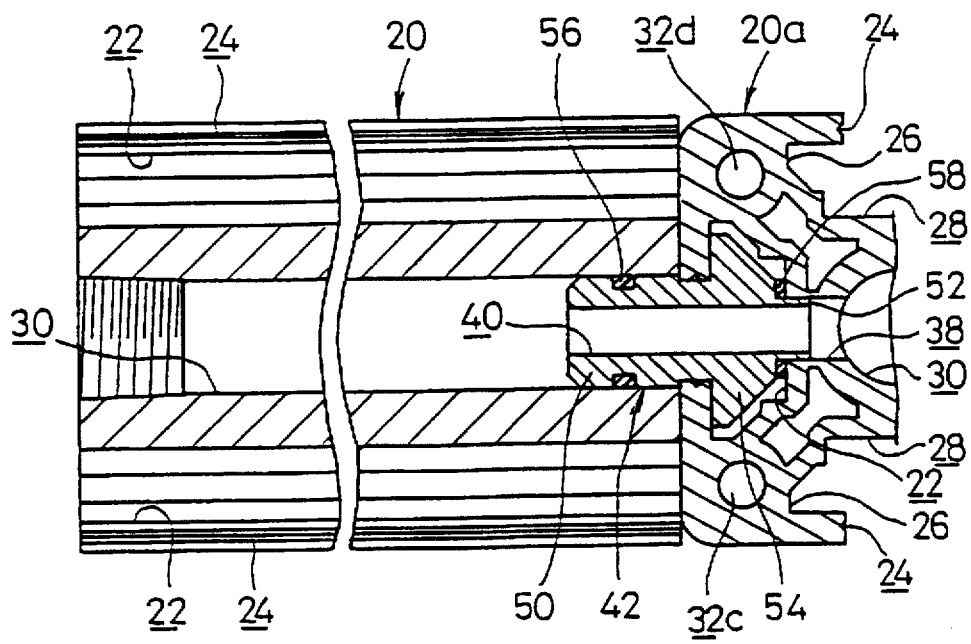
FIG. 5 is a cross-sectional view taken along line V—V of FIG. 4.

The structural member 20 further includes a first passage 30 of large diameter defined therein which extends along the axis thereof, second passages 32a–32d of small diameter defined therein near the four corners thereof and extending in the longitudinal direction of the structural member 20, and third passages 34a–34d defined therein which extends along the axis thereof, the third passages 34a–34d being positioned between the first passage 30 and the second passages 32a–32d. A plug 36 (see FIG. 4) is mounted in an end of the structural member 20a and closes the first passage 30. The structural member 20a has a hole 38 (see FIG. 5) defined therein in communication with the first passage 30.

A joint mechanism for joining structural members according to an embodiment of the present invention includes a passage communication member 42 (see FIGS. 4 and 5) having a through hole 40 defined therein which provides communication between the first passage 30 in the structural member 20 and the first passage 30 in the other structural member 20a. As shown in FIG. 4, the joint mechanism also has a first engaging member 44 inserted in the recess 29a (29b) in the structural member 20, a second engaging member 46 retained in one of the slots 22 in the structural member 20a, and a bolt 48 interconnecting the first engaging member 44 and the second engaging member 46. The structural members 20, 20a are joined to each other by mounting the first engaging member 44 in the structural member 20, mounting the second engaging member 46 in the structural member 20a, and then coupling the first engaging member 44 and the second engaging member 46 to each other with the bolt 48.

The passage communication member 42 comprises a tubular body 50 fitted in the first passage 30 extending axially in the structural member 20, and a head 54 having a projection 52 fitted in the hole 38 in the structural member 20a. The head 54 is of a substantially T shape and is fitted in the slot 22 in the structural member 20a. The tubular body 50 and the head 54 are integrally formed with each other, and a seal 56 is mounted in an annular groove defined in the tubular body 50. An elastic seal 58 is mounted on a surface of the head 54 around the projection 52 and held against an inner wall surface of the slot 22. Under the resiliency of the elastic seal 58, the head 54 is pressed toward the structural member 20 to hold the passage communication member 42 in the slot 22 (see FIG. 5).

The first engaging member 44 has a substantially circular profile complementary in shape to the recesses 29a, 29b, and has a rectangular hole 60 defined therein and a screw hole 61 defined therein which extends from the bottom of the rectangular hole 60 to an outer surface of the first engaging member 44. The second engaging member 46 has a substantially T-shaped head 62 on one end thereof which is held in the slot 22 and a threaded hole 64 defined in an opposite end remote from the head 62 for receiving the bolt 48 therein. The first and second engaging members 44, 46 should preferably be made of aluminum alloy, stainless steel, carbon steel, molybdenum steel, or the like, and manufactured by precision casting, precision (cold) forging, lost-wax process, metal powder injection sintering, or the like. The first and second engaging members 44, 46 thus produced have a high strength, require no substantial subsequent machining, and are light in weight and low in cost.

The joint mechanism according to this embodiment, which is basically of the above structure, operates as follows:

The substantially T-shaped head 54 of the passage communication member 42 is inserted from an end of the structural member 20a into one of the slots 22 therein while the longitudinal axis of the head 54 is being aligned with the longitudinal axis of the slot 22. After the head 54 is inserted, it is twisted about 90° into locking engagement with an inner wall surface of the slot 22, and the projection 52 is fitted into the hole 38 communicating with the first passage 30 (see FIG. 5). At this time, the seal 58 around the projection 52 elastically presses the inner wall surface of the slot 22, securing retaining the substantially T-shaped head 54 in the slot 22. As a result, the passage communication member 42 is held in position in the slot 22 in the structural member 20a, with the tubular body 50 projecting out of the slot 22. Then, as shown in FIG. 4, the other structural member 20 is oriented substantially perpendicularly to the structural member 20a, and an end of the structural member 20 is brought toward the structural member 20a until the tubular body 50 is fitted into the first passage 30 in the structural member 20. Therefore, the first passage 30 in the structural member 20a and the first passage 30 in the structural member 20 are held in communication with each other through the through hole 40 in the passage communication member 42. The seal 56 disposed around the passage communication member 42 fitted in the first passage 30 serves to hermetically seal the first passage 30.

Figure 6:
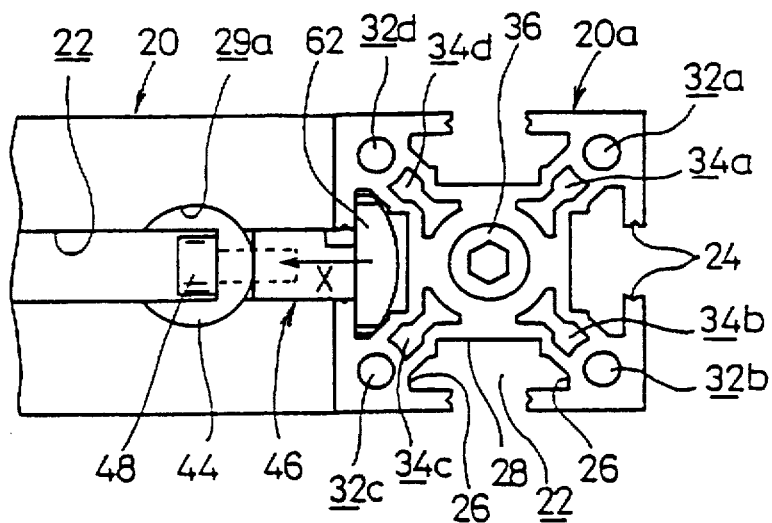
FIG. 6 is a plan view of the structural members which are joined to each other by the joint mechanism shown in FIG. 4.

Thereafter, the first engaging member 44 is inserted into the substantially circular recess 29a in the structural member 20, and the head 62 of the second engaging member 46 is inserted from the end of the structural member 20a into the slot 22 therein. Then, the bolt 48, placed in the slot 22 in the structural member 20, is threaded through the screw hole 61 in the first engaging member 44 into the threaded hole 64 in the second engaging member 46. As the bolt 48 is threaded in, the head 62 of the second engaging member 46 is pulled in the direction indicated by the arrow X in FIG. 6. As a consequence, the structural member 20a is displaced toward the structural member 20, and they are firmly joined to each other.

The joint mechanism according to this embodiment is thus effective in firmly joining the structural members 20, 20a to each other while keeping the first passages 30 in the structural members 20, 20a in communication with each other.

Figure 7:
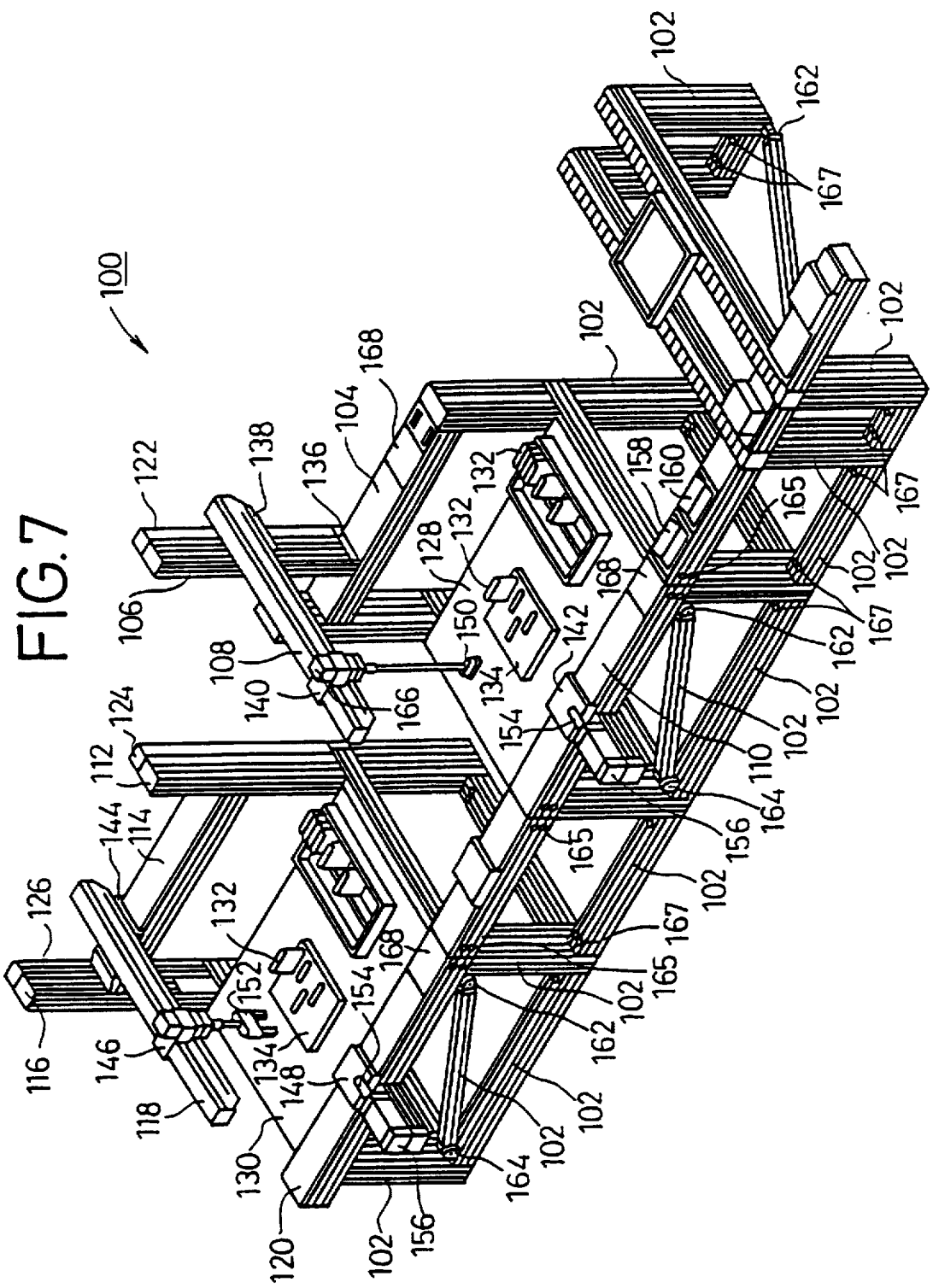
FIG. 7 is a perspective view of an assembly of structural members joined by joint mechanisms according to the embodiment of the present invention.

FIG. 7 shows an assembly of plural structural members joined by joint mechanisms according to this embodiment.

As shown in FIG. 7, the assembly, generally denoted by 100, comprises a plurality of structural members 102 which form an assembly skeleton, a plurality of actuators 104, 106, 108, 110, 112, 114, 116, 118, 120, a plurality of balancers 122, 124, 126 disposed parallel to the actuators 106, 112, 116, first and second working tables 128, 130, a plurality of workpieces 132, a plurality of workpiece holding plates 134, a plurality of movable bodies 136, 138, 140, 142, 144, 146, 148 combined with the actuators, a suction pad 150 and a mechanical hand 152 which function as workpiece gripping means, and a plurality of cylinders 156 having respective projecting cylinder rods 154. Sequencers 158, 160 with programming boards, which function as actuator controllers, are mounted on the upper surface of one of the structural members 102. Some of the structural members 102 are assembled in substantially rectangular structures each including a diagonal structural member 102 whose opposite ends are associated with joint members 162, 164 for reinforcing joined regions. Some of the structural members 102 are joined in line with each other by joint mechanisms 165, and some of the structural members 102 are substantially perpendicularly joined by joint mechanisms 167.

The first working table 128 will mainly be described in detail below.

The actuator 106 is vertically mounted on and substantially perpendicularly joined to the actuator 104 which is substantially horizontally arranged. The balancer 122 is disposed parallel to the actuator 106. The actuator 106 serves to move the actuator 108 fixed to the movable body 138 thereof in substantially vertical directions. A cylinder 166, to which the suction pad 150 is attached, is supported on the movable body 140 of the actuator 108 connected perpendicularly to the actuator 106. The cylinder 156 is attached to the movable body 142 of the actuator 110, and the cylinder rod 154 thereof serves to position a workpiece 132. Motor boxes 168 are disposed respectively in the actuators 104, 106, 108, 110, 112, 114, 116, 118, 120 and have respective upper surfaces lying flush with, but not projecting from, the upper surfaces of these actuators.

The first working table 128 operates as follows: Compressed air is supplied to the cylinder 166 coupled to the actuator 108 through fluid passages (the first, second, and third passages 30, 32a~32d, 34a~34d) in the structural members 102. Under the pressure of the supplied compressed air, the cylinder rod of the cylinder 166 is displaced downwardly, and a workpiece 132 placed on the workpiece holding plate 134 is attracted by the suction pad 150. Compressed air is supplied again to the cylinder 166, displacing the cylinder rod upwardly, and the movable body 136 of the actuator 104 is moved. The actuator 104 is inactivated when the workpiece 132 attracted by the suction pad 150 reaches a position above a desired position on the workpiece holding plate 134. Then, the movable body 138 of the actuator 106 is moved downwardly until the attracted workpiece 132 is inserted into a desired hole in the workpiece holding plate 134. At this time, the cylinder rod 154 of the actuator 110 may be displaced to position the workpiece 132 so that the workpiece 132 can reliably be inserted into the desired hole in the workpiece holding plate 134.

The joint mechanism according to this embodiment is not limited to the application to the assembly 100, but may be applied to various assemblies of structural members.

A joint mechanism for joining structural members according to another embodiment of the present invention will be described below with reference to FIGS. 8 through 11. Those parts of the joint mechanism and structural members in this and other embodiments which are identical to those in the previous embodiment are denoted by identical reference characters, and will not be described in detail below.

The joint mechanism according to the embodiment shown in FIGS. 8 through 11, which is used to join the structural members 20, 20a, comprises a pair of substantially rectangular adapter blocks 238a, 238b of substantially identical shape, a first knuckle 240 coupled to the adapter block 238a, a second knuckle 242 coupled to the adapter block 238b, and a pair of washers 250a, 250b disposed between the first and second knuckles 240, 242 and supported on a shaft 248 extending through holes 244, 246 that are defined in the first and second knuckles 240, 242. Covers 252a, 252b are attached respectively to opposite side surfaces of the first knuckle 240. The rectangular adapter blocks 238a, 238b have side surfaces shaped and dimensioned substantially identically to the ends of the structural members 20, 20a, and lying flush with the structural members 20, 20a.

Each of the adapter blocks 238a, 238b has attachment holes 256a-256d defined therein near respective four corners thereof for insertion of long screws 254 therethrough, and a through hole 260 defined substantially centrally therein for insertion of a bolt 258 therethrough. When the long screws 254 are threaded through the attachment holes 256a-256d of the adapter blocks 238a, 238b into the second passages 32a-32d, which are internally threaded, defined in the corners of the structural members 20, 20a that are held in line with each other, the adapter blocks 238a, 238b are fastened to the corresponding ends of the structural members 20, 20a.

The adapter blocks 238a, 238b have respective sets of straight ridges 262 on their surfaces which are held against the ends of the structural members 20, 20a. The ridges 262 are inserted in the respective cavities 28 of the slots 22 in the structural members 20, 20a when the adapter blocks 238a, 238b are joined to the ends of the structural members 20, 20a. The adapter blocks 238a, 238b also have respective substantially circular recesses 264 defined in their surfaces remote from the straight ridges 262 for receiving the bottoms of the first and second knuckle members 240, 242. The circular recess 264 has a bottom having a diameter large enough for the first knuckle 240 or the second knuckle 242 to be angularly moved in the circular recess 264 about the bolt 258. The adapter blocks 238a, 238b also have threaded holes 266 defined in inner walls of the recesses 264 and opening at side surfaces of the adapter blocks 238a, 238b. When setscrews 268 are threaded into the respective threaded holes 266, their tip ends are held against outer wall surfaces of the respective first and second knuckles 240, 242, holding the first and second knuckles 240, 242 at angles which have been established desirably with respect to the adapter blocks 238a, 238b.

The first knuckle 240 has a pair of substantially parallel spaced grippers 270 such that the first knuckle 240 has a substantially channel-shaped cross section. The first knuckle 240 also has a threaded hole 272 defined in a bottom thereof for threaded insertion of the bolt 258 therein. The second knuckle 242 has an attachment tongue 274 for being inserted between the grippers 270, and a threaded hole 272 defined in a bottom thereof for threaded insertion of the bolt 258 therein. The grippers 270 have the through holes 244 defined respectively therein, and the attachment tongue 274 has the through hole 246 defined therein. The shaft 248 extends through these through holes 244, 246 and also through the washers 250a, 250b.

The first knuckle 240 and the second knuckle 242 are coupled to each other for angular movement about the shaft 248. The first knuckle 240 and the second knuckle 242 are also mounted on the respective adapter blocks 238a, 238b for angular movement about the bolts 258, and can be fixed at a desired angle with respect to the respective adapter blocks 238a, 238b by the setscrews 268.

The structural members 20, 20a and the adapter blocks 238a, 238b should preferably be made of aluminum or aluminum alloy for smaller weight and higher rigidity. The first and second knuckles 240, 242 should preferably be made of aluminum alloy, stainless steel, carbon steel, molybdenum steel, or the like, and manufactured by precision casting, precision (cold) forging, lost-wax process, metal powder injection sintering, or the like. The first and second knuckles 240, 242 thus produced have a high strength, require no substantial subsequent machining, and are light in weight and low in cost.

The joint mechanism according to this embodiment operates as follows and offers the following advantages:

The surface of the adapter block 238b remote from the second knuckle 242 is positioned and against the end of the structural member 20. The ridges 262 of the adapter block 238b are guided along the flat bottoms 27 of the slots 22, and fitted into the cavities 28 thereof.

With the structural member 20 and the adapter block 238b being thus held against each other, the long screws 254 are threaded through the attachment holes 256a-256d of the adapter block 238b to fasten the structural member 20 and the adapter block 238b to each other. The joined surfaces of the structural member 20 and the adapter block 238b lie flush with each other (see FIG. 8). Specifically, the long screws 254 extend through the respective attachment holes 256a-256d of the adapter block 238b and are threaded into the second passages 32a-32d in the structural member 20.

Similarly, the surface of the adapter block 238a remote from the first knuckle 240 is positioned and against the end of the other structural member 20a, and the long screws 254 are threaded through the attachment holes 256a-256d defined in the adapter block 238a near its four corners to fasten the structural member 20a and the adapter block 238a to each other. The order in which the adapter blocks 238a, 238b are attached to the structural members 20, 20a is arbitrary, and either one of the adapter blocks 238a, 238b may be attached first to the corresponding one of the structural members 20, 20a.

Figure 8:
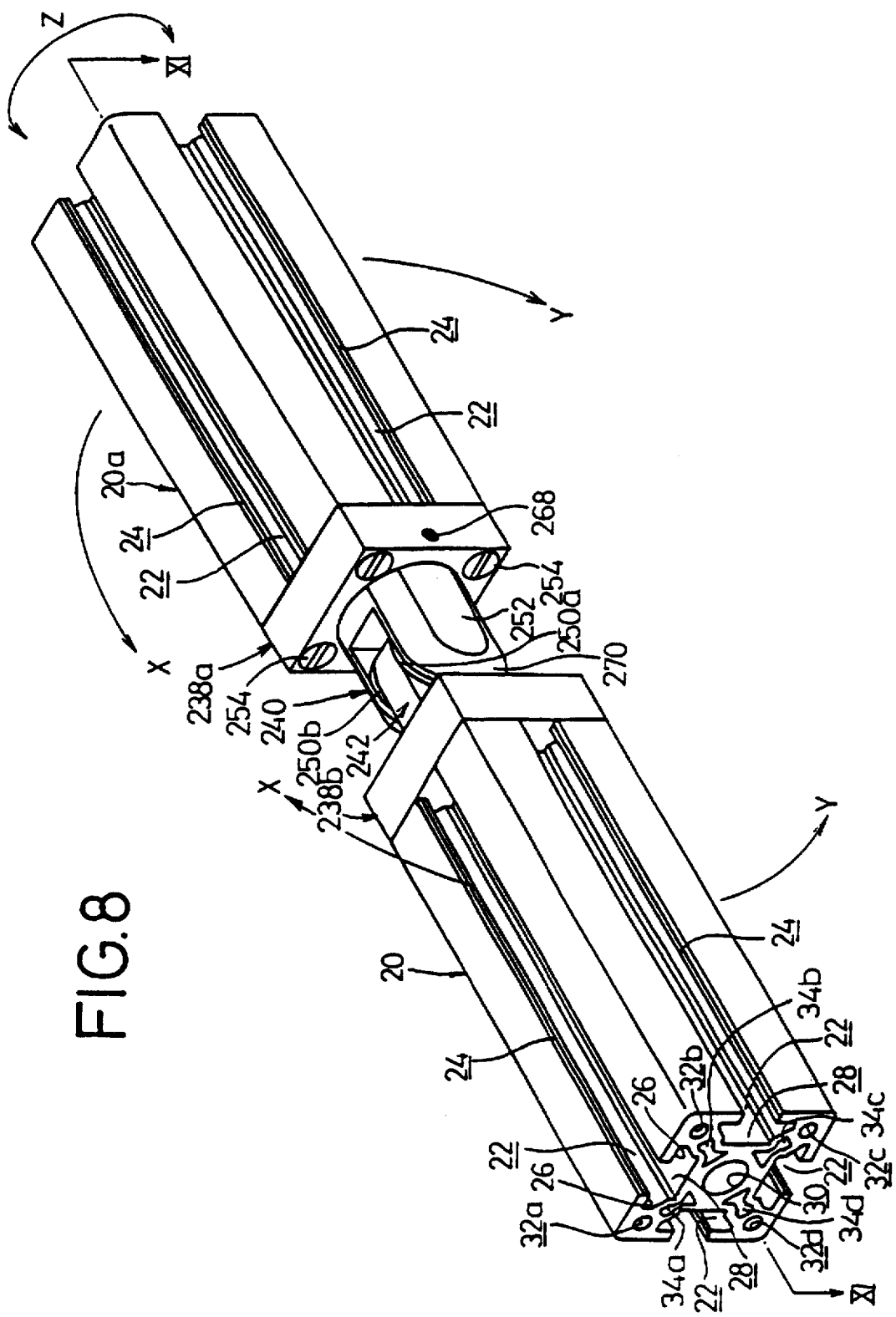
FIG. 8 is a perspective view of structural members which are joined to each other by a joint mechanism according to another embodiment of the present invention.
Figure 9:
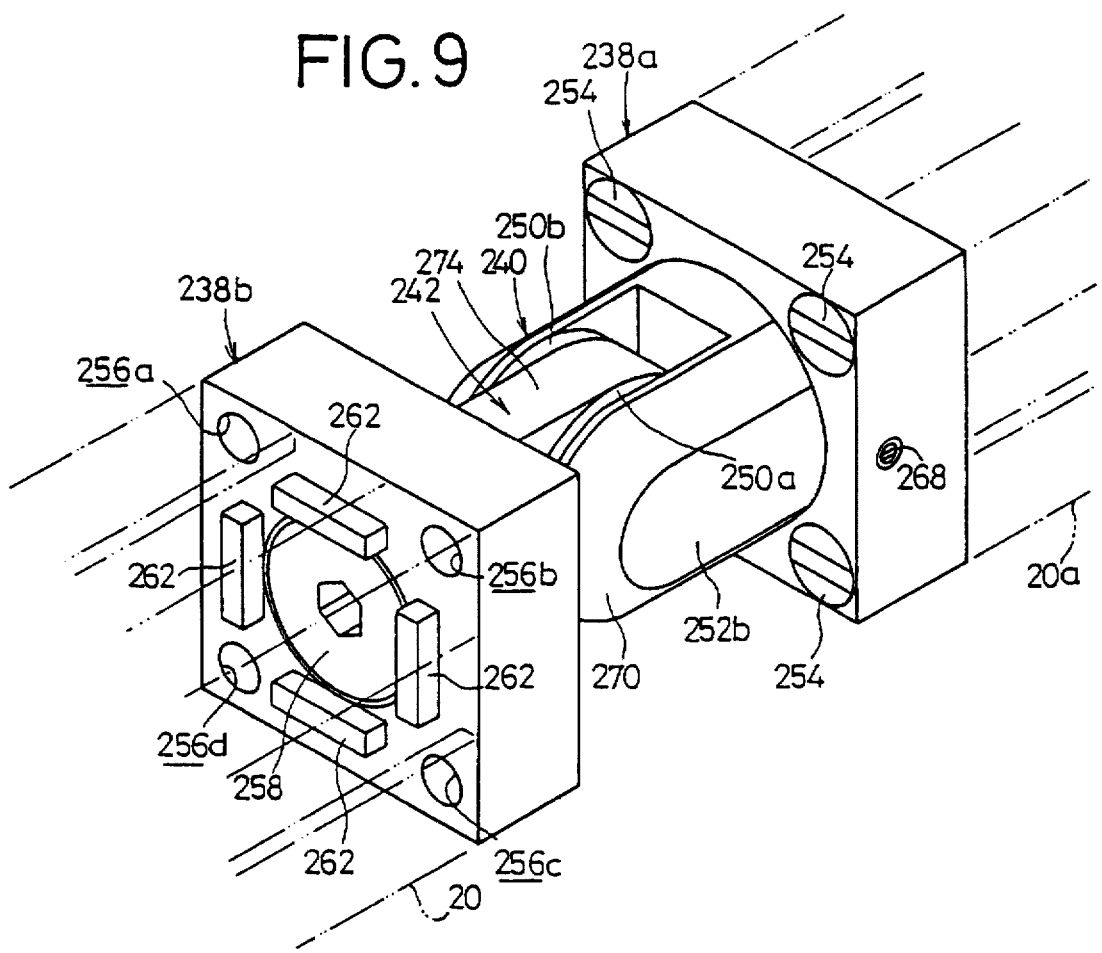
FIG. 9 is a perspective view of the joint mechanism shown in FIG. 8.
Figure 10:
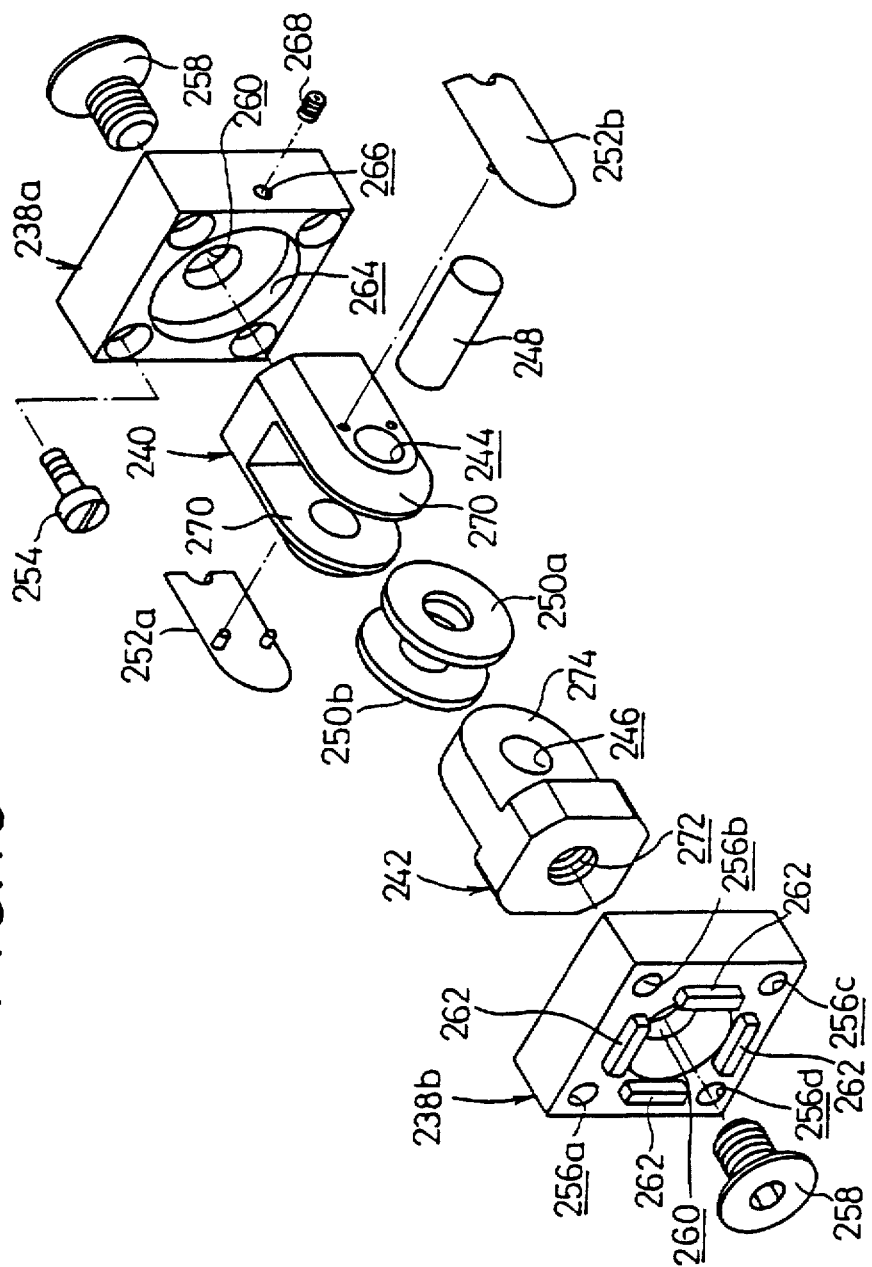
FIG. 10 is an exploded perspective view of the joint mechanism shown in FIG. 8.
Figure 11:
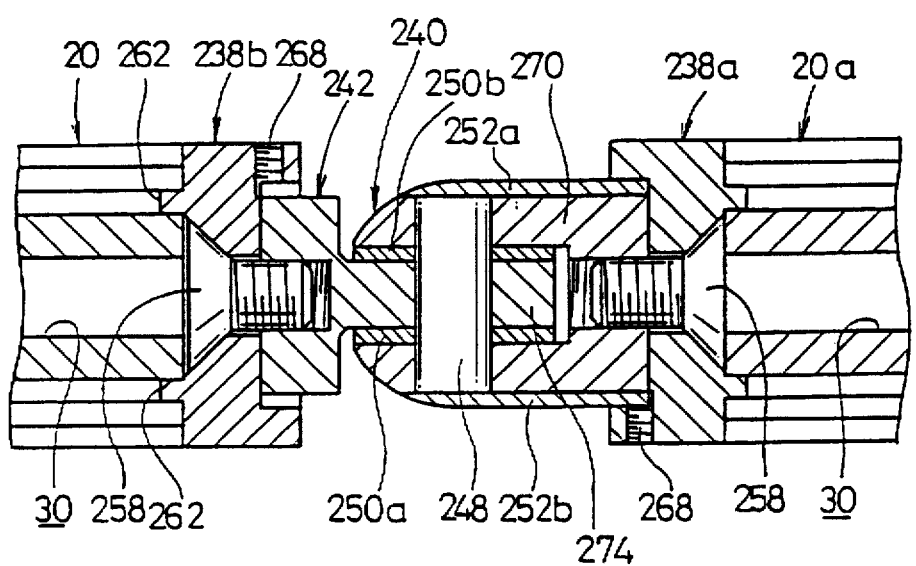
FIG. 11 is a fragmentary cross-sectional view taken along line XI—XI of FIG. 8.
Figure 12:
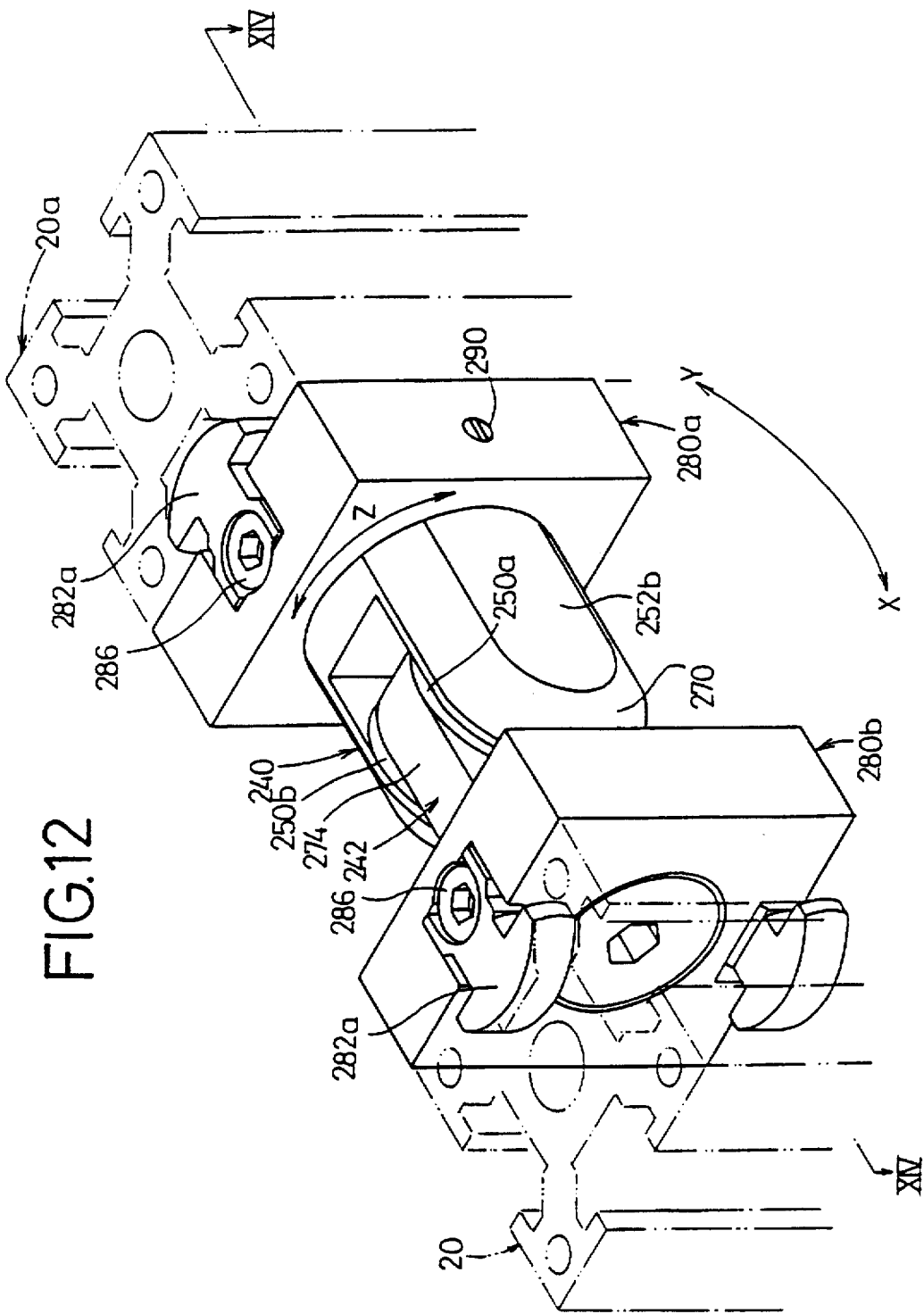
FIG. 12 is a perspective view of structural members which are joined to each other by a joint mechanism according to still another embodiment of the present invention.

As shown in FIG. 8, the structural members 20, 20a thus joined to each other can be angularly moved in the directions indicated by the arrows X or Y relatively to each other about the shaft 248 by which the first and second knuckles 240, 242 are coupled. The angles at which the first and second knuckles 240, 242 and the adapter blocks 238a, 238b are attached to each other may be varied using the setscrews 268 on the side surfaces of the adapter blocks 238a, 238b. Accordingly, it is possible to join the structural members 20, 20a to each other while they are being twisted a given angle in the directions indicated by the arrow Z.

A joint mechanism according to still another embodiment of the present invention is shown in FIGS. 12 through 15.

The joint mechanism according to this embodiment differs from the joint mechanism according to the preceding embodiment in that it joins confronting side surfaces of structural members to each other. The joint mechanism according to this embodiment can join the structural members 20, 20a even when they extend parallel to each other.

Figure 15:
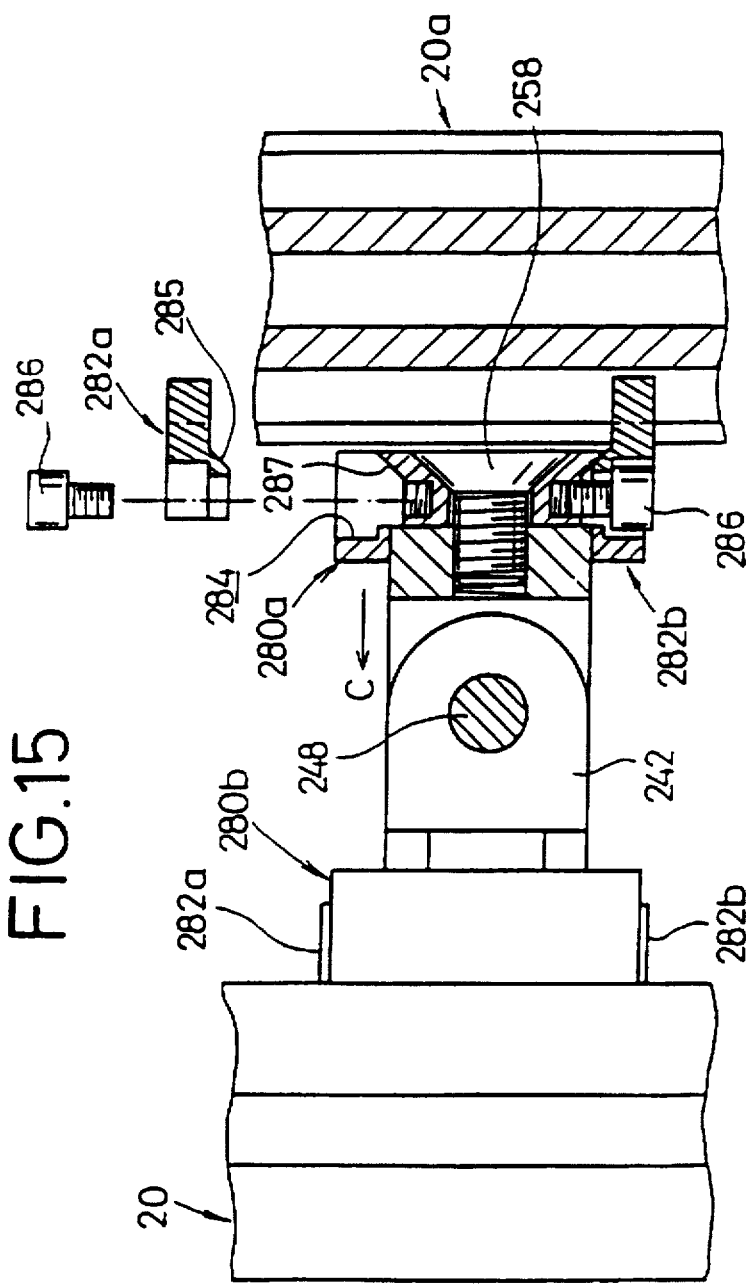
FIG. 15 is a fragmentary longitudinal cross-sectional view of the joint mechanism shown in FIG. 12.

Specifically, a pair of adapter blocks 280a, 280b is different in shape from the adapter blocks according to the preceding embodiment. The adapter blocks 280a, 280b have recesses 284 in upper and lower surfaces thereof for installing respective hooks 282a, 282b therein (see FIG. 13). The hooks 282a, 282b have substantially T-shaped tip ends which are inserted and held in the corresponding slots 22 of the structural members 20, 20a. The hooks 282a, 282b are fixed to the upper and lower surfaces of the adapter blocks 280a, 280b by screws 286. As shown in FIG. 15, when the hook 282a (282b) is to be securely placed in the recess 284 in the adapter block 280a, a tapered surface 285 of the hook 282a (282b) is held against a tapered surface 287 of the recess 284. The hook 282a is then pressed downwardly when the screw 286 is threaded and tightened. As a result, the hook 282a (282b) is displaced in the direction indicated by the arrow C along the slanting tapered surface 287, and fixedly held in the recess 284 (see FIG. 15).

Figure 13:
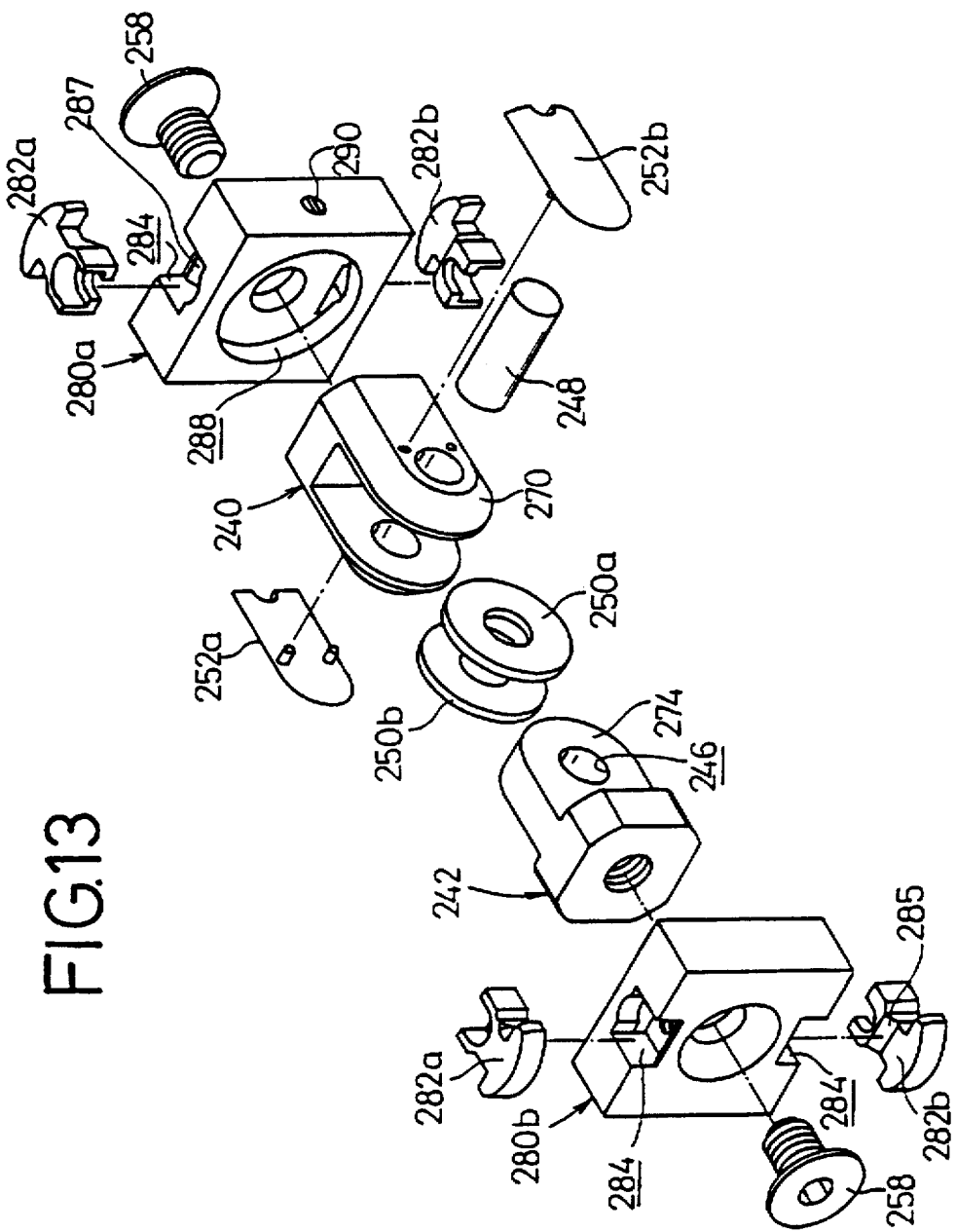
FIG. 13 is an exploded perspective view of the joint mechanism shown in FIG. 12.
Figure 14:
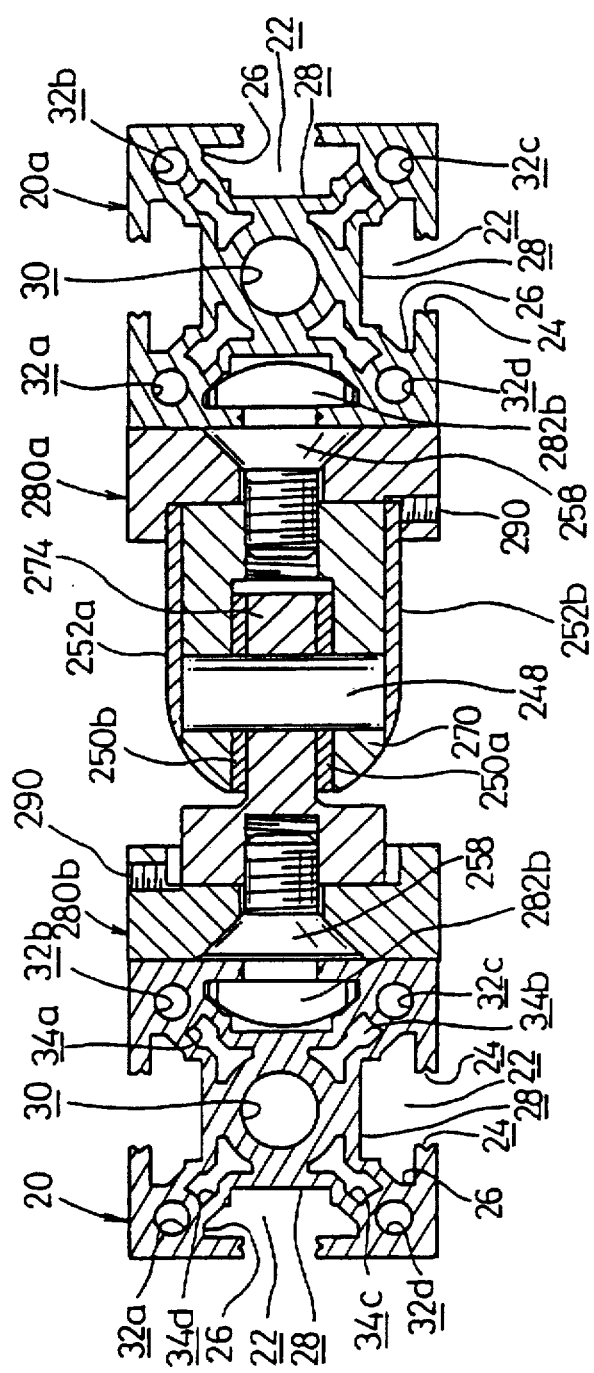
FIG. 14 is a cross-sectional view taken along line XIV—XIV of FIG. 12.

As shown in FIG. 13, the adapter blocks 280a, 280b also have respective substantially circular recesses 288 for receiving the bottoms of the first and second knuckle members 240, 242. The first and second knuckle members 240, 242 are fastened to the respective adapter blocks 280a, 280b by the bolts 258. The joint mechanism according to the present embodiment is the same as the joint mechanism according to the preceding embodiment in that the first and second knuckle members 240, 242 are angularly movable in the recesses 288 in the directions indicated by the arrow Z about the bolts 258, can be retained in a desired angle with respect to the adapter blocks 280a, 280b by setscrews 290, and can be angularly moved in the direction indicated by the arrow X or Y relatively to each other about the shaft 248 by which the first and second knuckles 240, 242 are coupled (see FIG. 12).

For mounting the adapter blocks 280, 280a on the respective structural members 20, 20a, the tip ends of the hooks 282a on the upper and lower surfaces of the adapter blocks 280, 280a are inserted from ends of the structural members 20, 20a into the structural members 20, 20a along the slots 22. Then, the screws 286 are tightened to secure the hooks 282a, 282b in the adapter blocks 280a, 280b and fix the adapter blocks 280a, 280b to the structural members 20, 20a with the hooks 282a, 282b that are retained in the slots 22.

Alternatively, it may be possible to detach the hooks 282a, 282b in advance from the adapter blocks 280a, 280b, insert the tip ends of the hooks 282a, 282b longitudinally into the slots 22, thereafter turn the hooks 282a, 282b about 90° until the tip ends of the hooks 282a, 282b extend perpendicularly to the longitudinal axis of the slots 22, and couple the hooks 282a, 282b in the slots 22 to the adapter blocks 280a, 280b with the screws 286.

Therefore, the structural members 20, 20a can be fixed to each other at a desired angle with the joint mechanism according to this embodiment. The joint mechanism according to this embodiment may be connected to angularly movable members such as door hinges, for example. FIG. 7 shows a preferable example in which structural members may be joined by joint mechanisms according to this embodiment.

A joint mechanism according to yet still another embodiment of the present invention is illustrated in FIGS. 16 through 25. For using the joint mechanism according to this embodiment, the structural members 20, 20a have substantially circular recesses 334, 334a defined in mutually close regions thereof near their confronting ends for receiving first and second engaging members 330, 332, respectively, shown in FIGS. 17 and 18.

As shown in FIG. 17, the joint mechanism for joining the structural members 20, 20a comprises a first engaging member 330 having a disk 342 of substantially circular cross section and a pair of substantially triangular fingers 344 integrally formed with and angularly spaced 180° from each other on an outer circumferential surface of the disk 342, and a second engaging member 332 having a disk-shaped head 346 and a bar 348 of prismatic shape integrally formed with the head 346.

The first engaging member 330 has a hole 350 of regular hexagonal shape defined substantially centrally in an upper surface thereof, and a substantially circular hole 352 defined in a lower surface thereof eccentrically with respect to, i.e., out of coaxial alignment with, the hole 350. Since the circular hole 352 is off-center, the thickness of a wall extending around the circular hole 352 progressively varies from a smaller wall thickness to a greater wall thickness. The end of the bar 348 of the second engaging member 332 which is remote from the head 346 has a hook 354 that has a curved surface held snugly against a curved inner wall surface of the hole 352. The structural members 20, 20a should preferably be made of a metallic material, and the first and second engaging members 330, 332 should preferably be made of aluminum alloy, stainless steel, carbon steel, molybdenum steel, or the like, and manufactured by precision casting, precision (cold) forging, lost-wax process, metal powder injection sintering, or the like. The first and second engaging members 330, 332 thus produced have a high strength, require no substantial subsequent machining, and are light in weight and low in cost.

The joint mechanism according to this embodiment operates as follows and offers the following advantages:

First, the second engaging member 332 is inserted into the structural member 20a along one of the slots 22 therein. The head 346 of the second engaging member 332 is fitted into the substantially circular hole 334a, and lies flush with the structural member 20a, whereupon the second engaging member 332 is retained in the slot 22 in the structural member 20a. Specifically, the lower surface of the second engaging member 332 abuts against the bottom surface 27 of the slot 22, and the upper surface of the second engaging member 332 lies flush with the upper surface of the structural member 20a. Accordingly, the second engaging member 332 is mounted in the slot 22 without projecting out of the structural member 20a. Since the second engaging member 332 does not present an obstacle when the structural members 20, 20a are assembled together, it allows a space around the structural members 20, 20a to be utilized effectively.

Then, the end of the other structural member 20 is brought closely to the end of the structural member 20a substantially in line therewith. With the hook 354 of the second engaging member 332 being held in engagement with the inner wall surface of the substantially circular hole 352 in the first engaging member 330, the first engaging member 330 is inserted into the substantially circular recess 334 that communicates with one of the slots 22 in the structural member 20, until the first engaging member 330 in the substantially circular recess 334 lies flush with the structural member 20. At this time, the inner wall surface of the recess 352 in the lower surface of the first engaging member 330 is held in engagement with the curved surface of the hook 354 on the end of the second engaging member 332, and the fingers 344 on the outer circumferential surface of the disk 342 of the first engaging member 330 are inserted in the slot 22 along its longitudinal axis.

Figure 19:
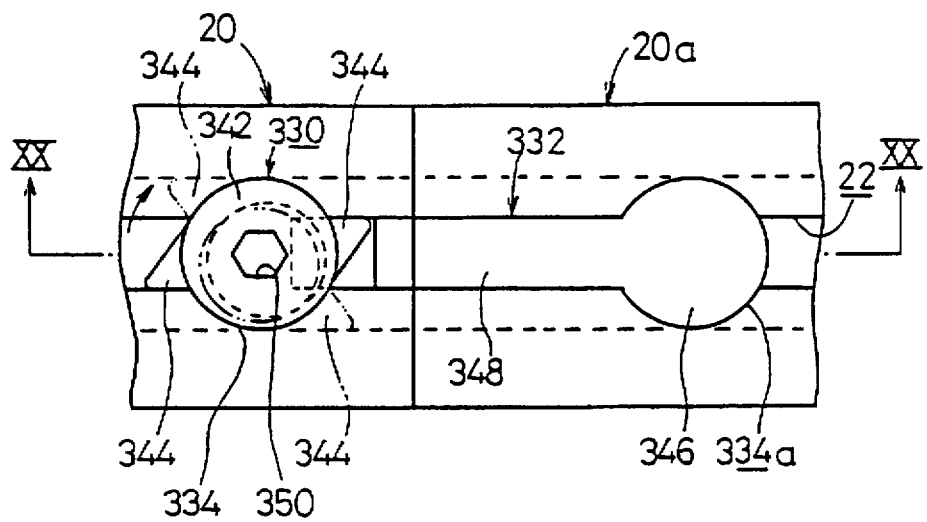
FIG. 19 is a fragmentary plan view of the joint mechanism shown in FIG. 16.

After the first engaging member 330 is inserted into the recess 334, the tip end of a tool such as a hexagonal wrench is fitted into the hole 350 in the first engaging member 330, and turned in the direction indicated by the arrow in FIG. 19. When the first engaging member 330 is angularly moved until the fingers 344 abut against wall surfaces of the enlarged portion 26 of the slot 22 around the recess 334, the thickness of the wall of the first engaging member 330 which engages the curved surface of the hook 354 changes from the smaller wall thickness to the greater wall thickness. Therefore, the first engaging member 330 applies forces tending to pull the second engaging member 332 in the direction indicated by the arrow X in FIG. 20, displacing the second engaging member 332 in the direction indicated by the arrow X. The fingers 344 can easily be turned because the disk 342 of the first engaging member 330 is retained in the substantially circular recess 334 in the structural member 20.

At the time the fingers 344 of the first engaging member 330 are held against the wall surfaces of the enlarged portion 26 of the slot 22, the first engaging member 330 is securely retained in the slot 22 in the structural member 20.

Figure 20:
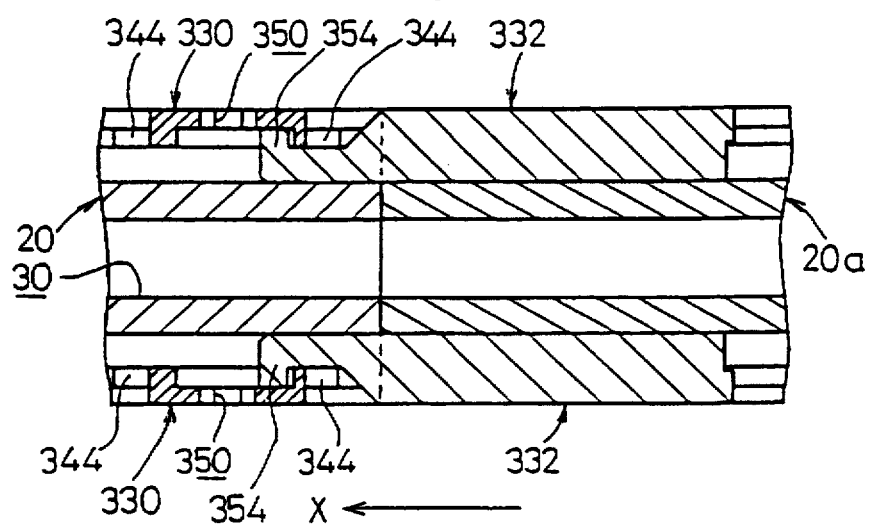
FIG. 20 is a cross-sectional view taken along line XX—XX of FIG. 19.

As a consequence, the first engaging member 330 and the second engaging member 332 engage each other, firmly joining the structural members 20, 20a to each other. Joint mechanisms according to this embodiment may be mounted on two opposite side surfaces, respectively, of the structural members 20, 20a as shown in FIG. 20. Alternatively, joint mechanisms according to this embodiment may be mounted on three or four side surfaces, respectively, of the structural members 20, 20a for more securely joining the structural members 20, 20a for greater rigidity. Since the joint mechanism joins the structural members 20, 20a using at least one of the slots 22 defined in the respective four side surfaces of each of the structural members 20, 20a, the first and second engaging members 330, 332 may be mounted on a desired selected one of the four side surfaces of each of the structural members 20, 20a. Consequently, even if certain side surfaces of the structural members 20, 20a are not available because of limitations imposed by the conditions in which they are installed, the joint mechanism may be mounted on other available unlimited side surfaces of the structural members 20, 20a for thereby joining the structural members 20, 20a to each other.

Figure 21:
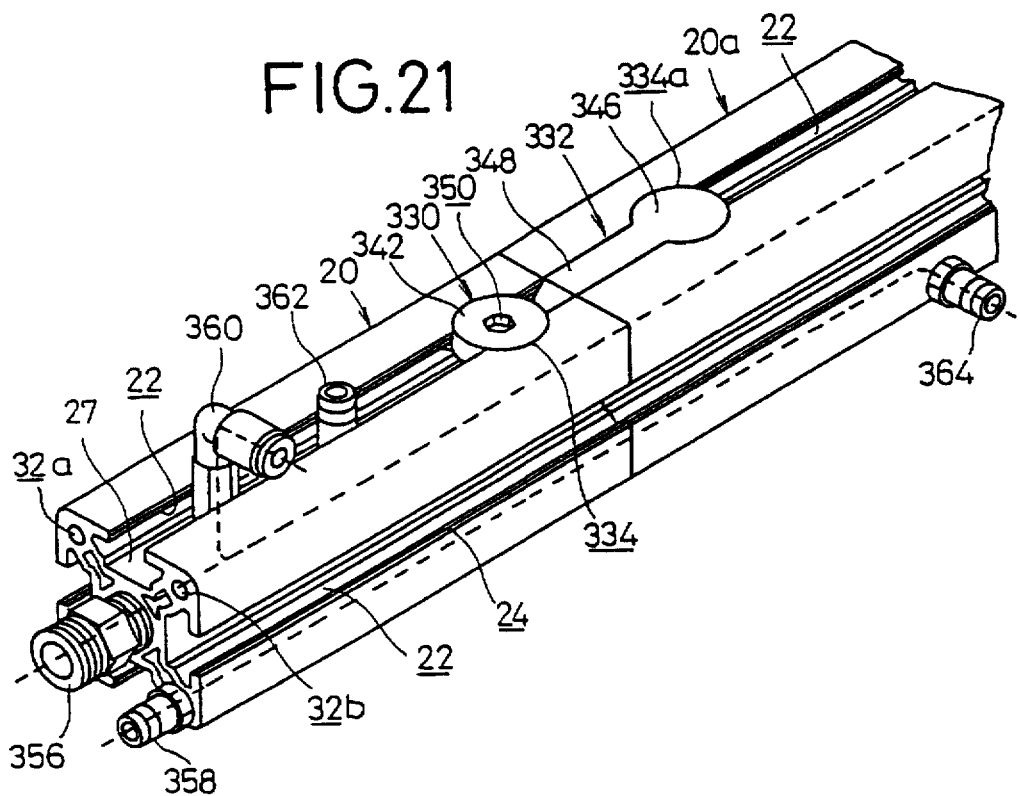
FIG. 21 is a perspective view of the joined structural members shown in FIG. 16, with various pipe joints connected thereto.

FIG. 21 shows in perspective the structural members 20, 20a joined to each other by the joint mechanism, with various pipe joints 356, 358, 360, 362, 364 connected thereto in communication with the first passages 30 and the second passages 32a–32d. In order to connect the L-shaped pipe joint 362 and the pipe joint 362, holes (not shown) having respective diameters corresponding to those of the pipe joints 360, 362 are defined in the bottom 27 of the corresponding slot 22. To connect the pipe joint 364, a hole is defined in a side surface of the structural member 20a.

Figure 22:
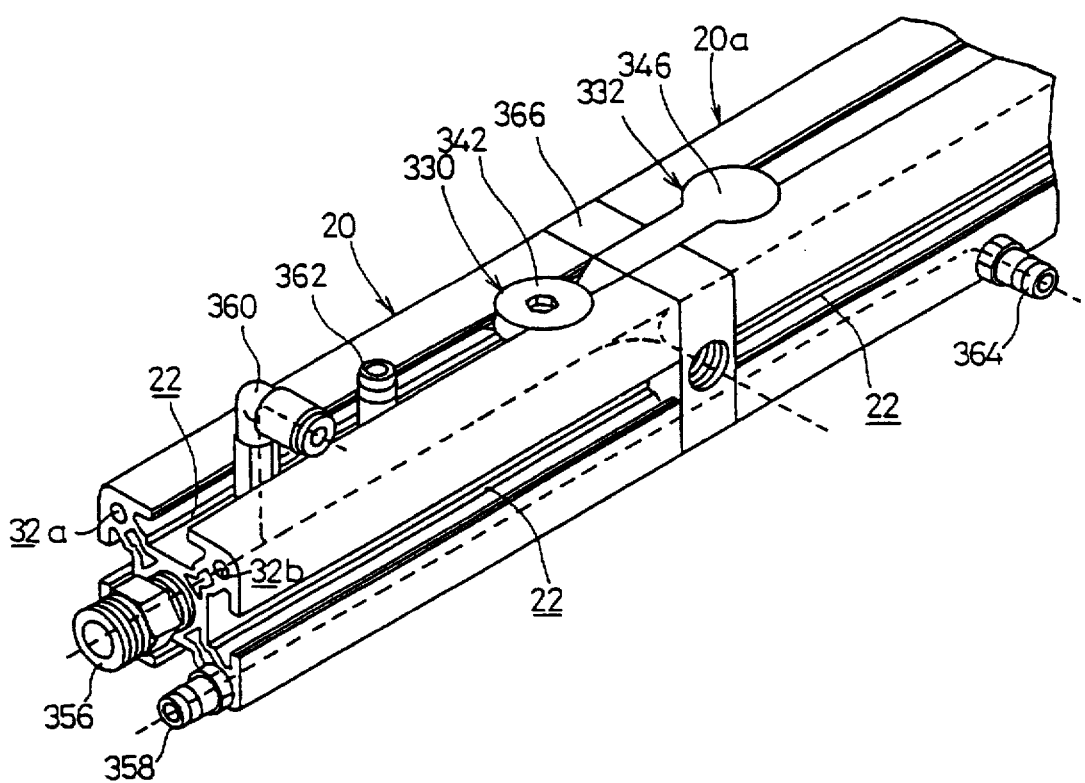
FIG. 22 is a perspective view of the joined structural members shown in FIG. 21, with an insert interposed between the structural members.
Figure 23:
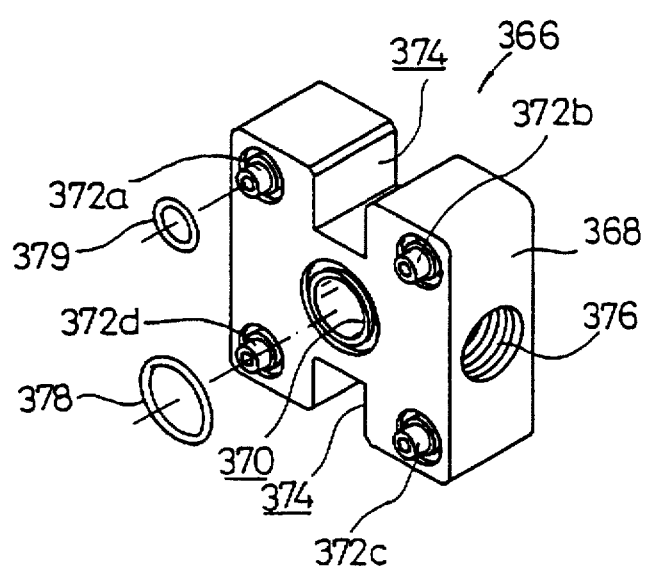
FIG. 23 is a perspective view of the insert shown in FIG. 22.
Figure 24:
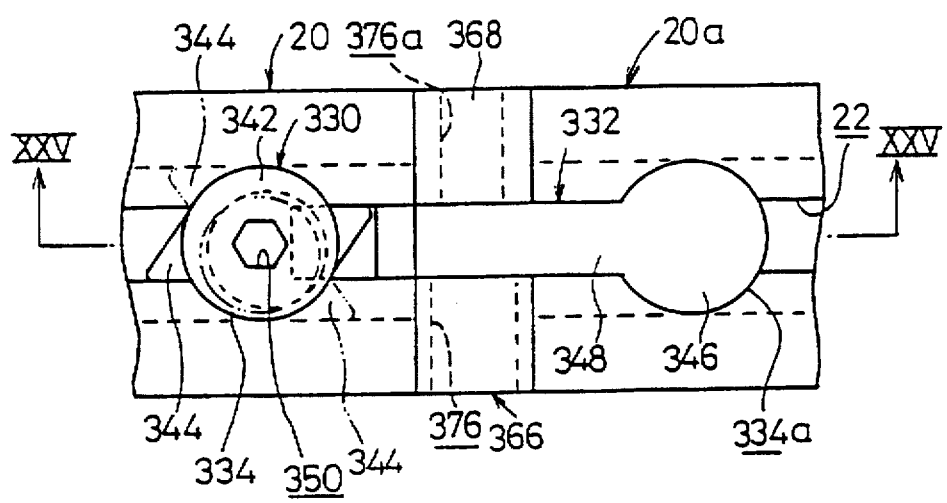
FIG. 24 is a fragmentary plan view of the structural members and the insert shown in FIG. 22.
Figure 25:
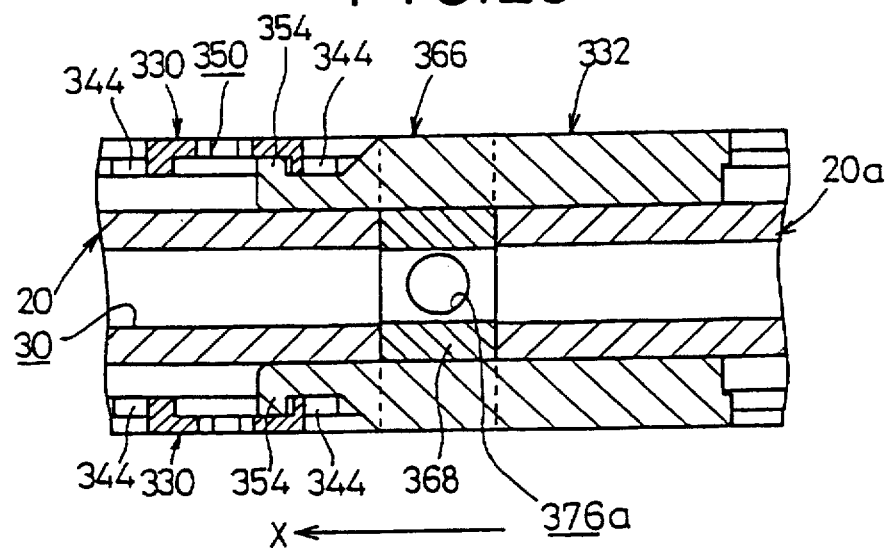
FIG. 25 is a cross-sectional view taken along line XXV—XXV of FIG. 24.
Figure 26:
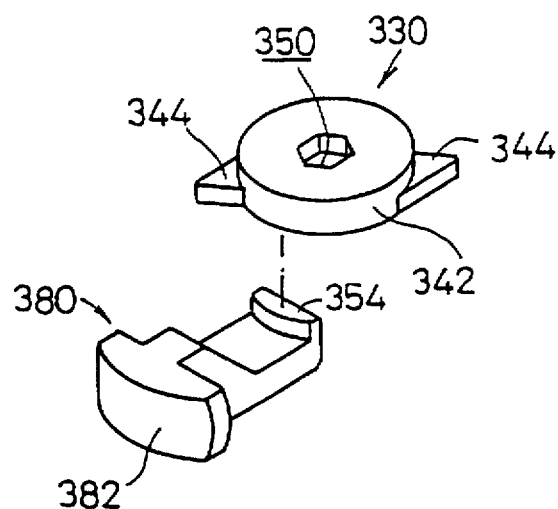
FIG. 26 is an exploded perspective view of a joint mechanism for joining structural members according to a further embodiment of the present invention.
Figure 27:
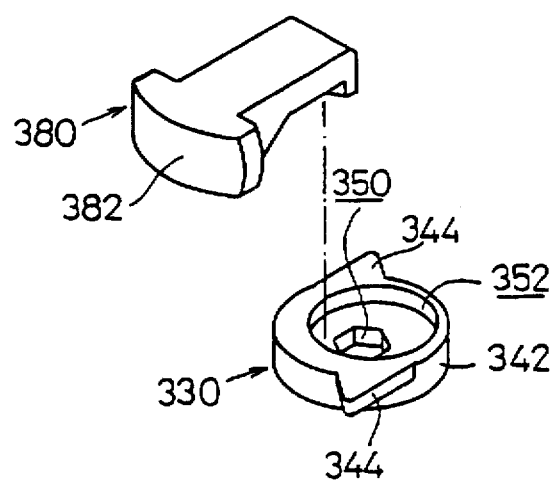
FIG. 27 is an exploded perspective view of the joint mechanism, as viewed from behind, shown in FIG. 26.

FIG. 22 shows in perspective the joined structural members 20, 20a shown in FIG. 21, with an insert 366 interposed between the structural members 20, 20a. As shown in FIG. 23, the insert 366 comprises a substantially H-shaped block 368 having a first through hole 370 defined substantially centrally therein in communication with the first passage 30 in each of the structural members 20, 20a and supporting tubes 372a–372d projecting from a surface thereof near respective four corners thereof in communication with the second passages 32a–32d in each of the structural members 20, 20a. The tubes 372a–372d have respective through passages extending from one surface to the other of the block 368, and also project from the opposite surface thereof. The insert 366 has a pair of substantially rectangular recesses 374 defined in respective opposite side surfaces thereof for receiving the bar 348 of the second engaging member 332.

The insert 366 also has a second through hole 376 defined therein which extends perpendicularly to the axis of the first through hole 370 in communication therewith, the second through hole 376 opening at opposite side surfaces of the insert 366. The second through hole 376 includes a reduced-diameter through hole 376a (see FIGS. 24 and 25) extending from a region where the second through hole 376 communicates with the first through hole 370. The second through hole 376 is internally threaded at an inlet end thereof, so that a pipe joint, for example, can easily be connected to the second through hole 376 by being threaded into the internally threaded inlet end of the second through hole 376. Seals 378, 379 are mounted in annular grooves defined around the first through hole 370 and the tubes 372a–372d for allowing the first through hole 370 and the tubes 372a–372d to be hermetically connected to the structural members 20, 20a.

For coupling the insert 366 between the structural members 20, 20a, the insert 366 is placed between the confronting ends of the structural members 20, 20a, and the tubes 372a–372d projecting toward the ends of the structural members 20, 20a are fitted into the second passages 32a–32d in the structural members 20, 20a, before the first and second engaging members 330, 332 are installed. As a result, the first passages 30 in the structural members 20, 20a communicate with each other through the first through hole 370, and communication passages defined in the structural members 20, 20a along the axes thereof communicate with the second through hole 376, 376a perpendicular to the first through hole 370. The first engaging member 330 and the second engaging member 332 are installed in the same manner as described above, and hence the process of installing the first engaging member 330 and the second engaging member 332 will not be described in detail below.

A joint mechanism for joining structural members according to a further embodiment of the present invention is shown in FIGS. 26 through 31.

The joint mechanism according to this embodiment is different from the joint mechanism according to the preceding embodiment in that a second engaging member 380 has a substantially T-shaped head 382 (see FIGS. 26 and 27), and the joint mechanism is used to join the structural members 20, 20a substantially perpendicularly to each other (see FIG. 28). The joint mechanism has a first engaging member 330 which is of a structure that is substantially identical to the first engaging member 330 according to the preceding embodiment.

Figure 31:
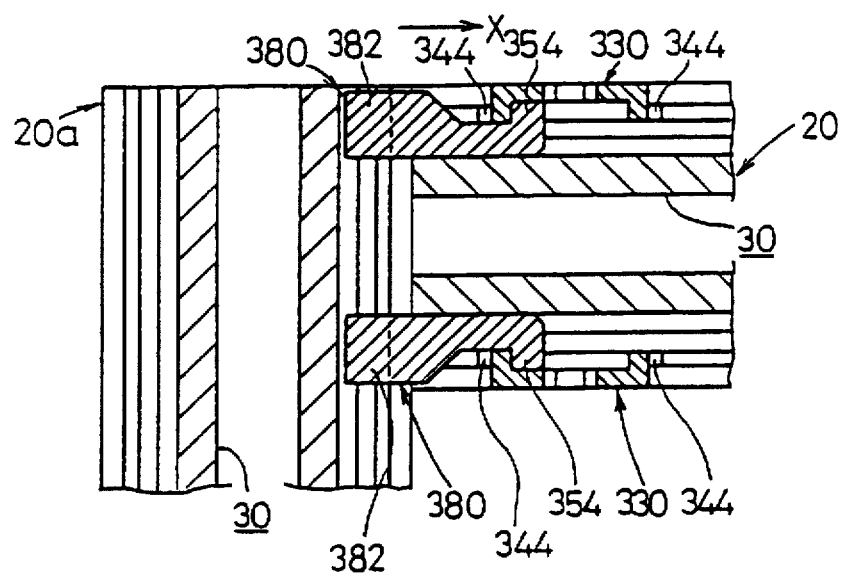
FIG. 31 is a vertical cross-sectional view of structural members which are joined to each other by joint mechanisms shown in FIG. 28 which are positioned respectively on upper and lower surfaces of one of the structural members.

For joining the structural members 20, 20a to each other, the head 382 of the second engaging member 380 is inserted from an end of the structural member 20a into one of the slots 22 therein. Alternatively, after the head 382 is inserted longitudinally into the slot 22, the head 382 may be turned about 90° so as to be mounted in the slot 22. Then, the first engaging member 330 is inserted into the slot 22 such that the inner wall surface of the substantially circular hole 352 in the first engaging member 330 engages the curved surface of the hook 354 on an end of the second engaging member 380. At this time, the first engaging member 330 is retained in the substantially circular recess 334 in the slot 22, and the first engaging member 330 is inserted so as to align the fingers 344 with the slot 22, as indicated by the solid lines in FIG. 28. Since the circular hole 352 is off-center, the thickness of the wall extending around the circular hole 352 progressively varies from the smaller wall thickness to the greater wall thickness. When the first engaging member 330 is then angularly moved a predetermined angle, the fingers 344 of the first engaging member 330 are angularly displaced the predetermined angle as indicated by the broken lines in FIG. 28. As a result, as shown in FIG. 30, the thicker wall portion of the first engaging member 330 abuts against the curved surface of the hook 354 of the second engaging member 380, pulling the second engaging member 380 in the direction indicated by the arrow X. Therefore, the structural member 20a is pulled in the direction indicated by the arrow X, and joined and fixed perpendicularly to the other structural member 20. As shown in FIG. 31, joint mechanisms according to the present embodiment may be mounted respectively on upper and lower surfaces of the structural member 20 to firmly join the structural members 20, 20a with increased rigidity.

FIGS. 32 through 35 show a joint mechanism for joining structural members according to a yet still further embodiment of the present invention. The joint mechanism according to this embodiment is used to join the structural members 20, 20a substantially perpendicularly to each other.

Figure 32:
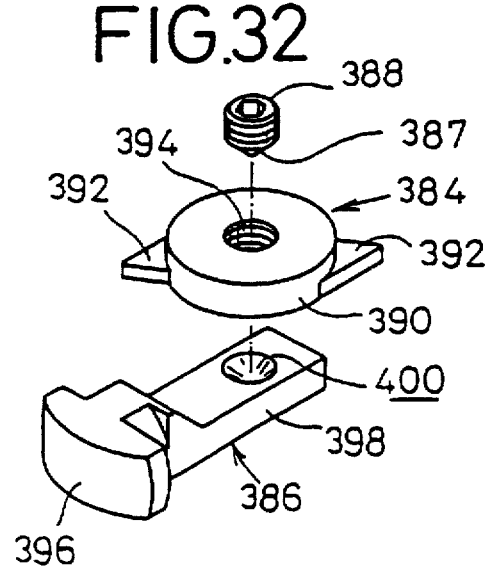
FIG. 32 is an exploded perspective view of a joint mechanism for joining structural members according to a yet still further embodiment of the present invention.
Figure 33:
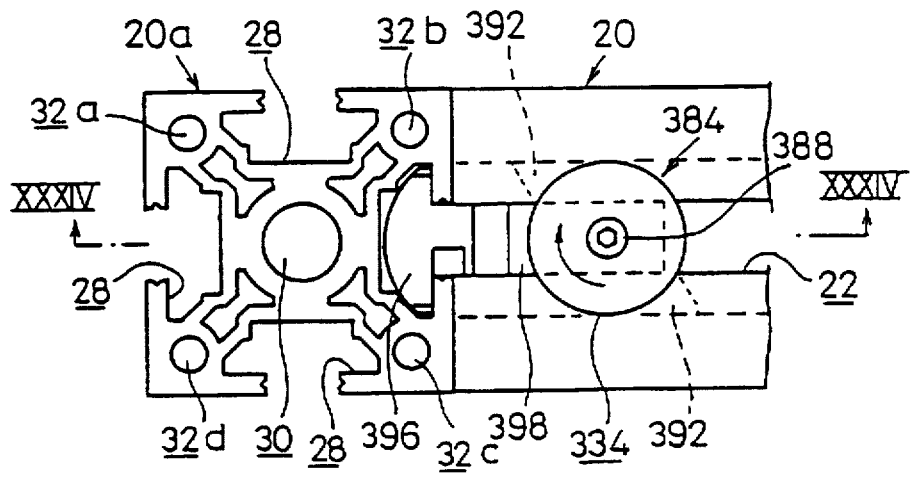
FIG. 33 is a side elevational view of structural members which are joined to each other by the joint mechanism shown in FIG. 32.
Figure 34:
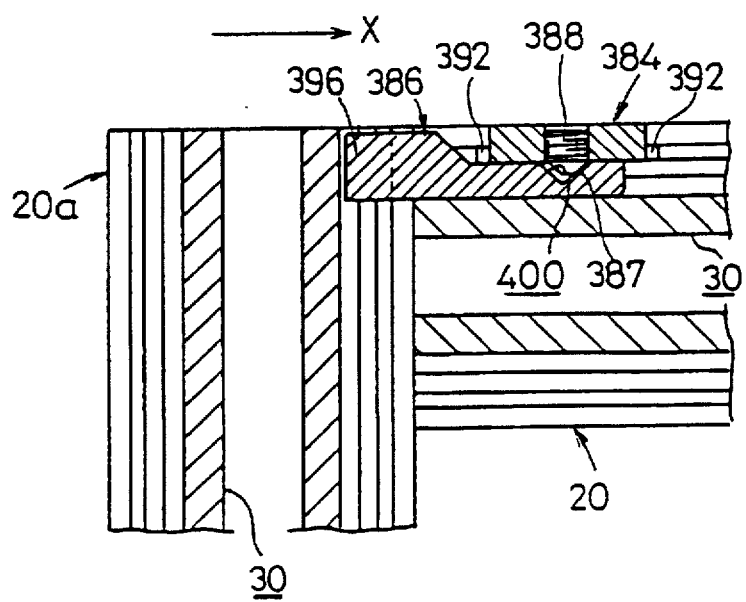
FIG. 34 is a cross-sectional view taken along line XXXIV—XXXIV of FIG. 33.

As shown in FIG. 32, the joint mechanism comprises first and second engaging members 384, 386, and a screw 388 having a tapered tip end 387 which is progressively smaller in diameter. The first engaging member 384 has a pair of fingers 392 disposed on an outer circumferential surface of a cylinder 390 and angularly spaced 180° from each other. The first engaging member 384 also has an internally threaded through hole 394 defined centrally therein. The second engaging member 386 has a substantially T-shaped head 396 and a flat plate 398 joined to the head 396 and having a tapered recess 400 remote from the head 396.

For joining the structural members 20, 20a to each other, the head 396 of the second engaging member 386 is inserted from an end of the structural member 20a into one of the slots 22 therein. Alternatively, after the head 396 is inserted longitudinally into the slot 22, the head 396 may be turned about 90° so as to be mounted in the slot 22. Then, the other structural member 20 is placed substantially perpendicularly to the structural member 20a, and the flat plate 398 of the second engaging member 286 which projects from the structural member 20a is inserted into the slot 22 in the other structural member 20.

The first engaging member 384 is inserted into the substantially circular recess 334 in the slot 22 in the structural member 20. Since the diameter of the substantially circular recess 334 is substantially the same as the diameter of the cylinder 390, the first engaging member 384 is retained in the recess 334. At this time, the first engaging member 384 is inserted so as to align the fingers 392 with the slot 22.

Figure 35:
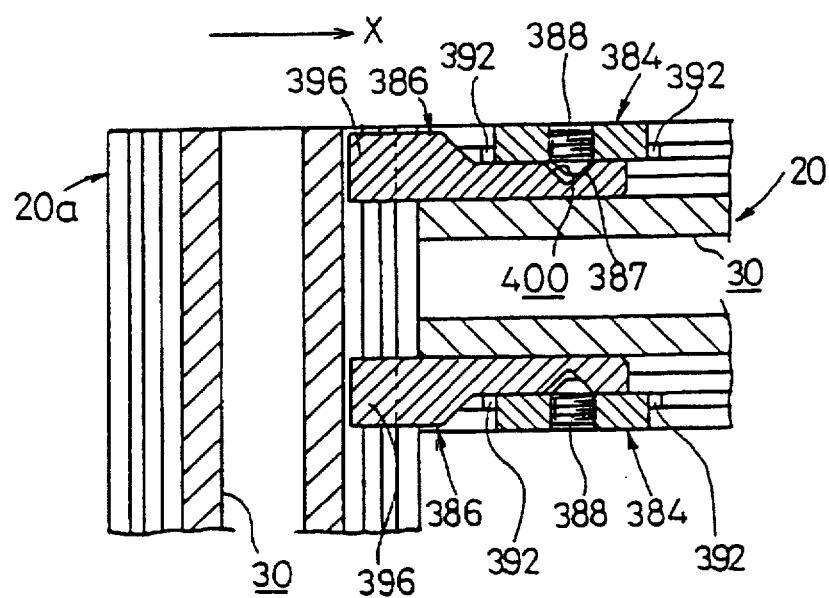
FIG. 35 is a vertical cross-sectional view of structural members which are joined to each other by joint mechanisms shown in FIG. 32 which are positioned respectively on upper and lower surfaces of one of the structural members.
Figure 36:
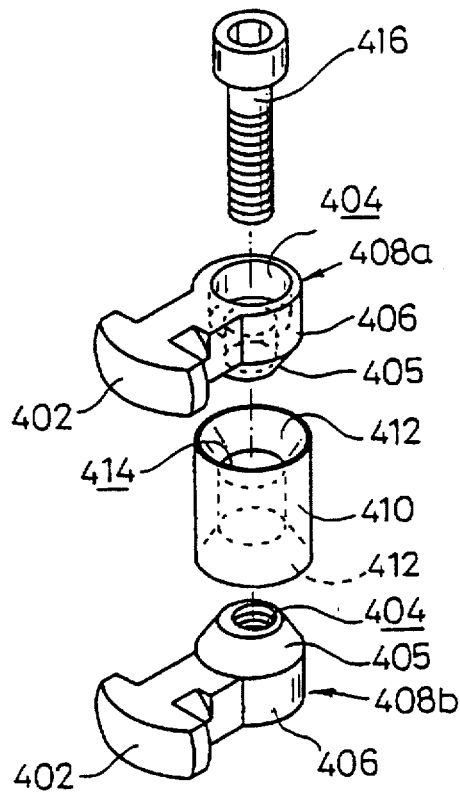
FIG. 36 is an exploded perspective view of a joint mechanism for joining structural members according to another embodiment of the present invention.
Figure 37:
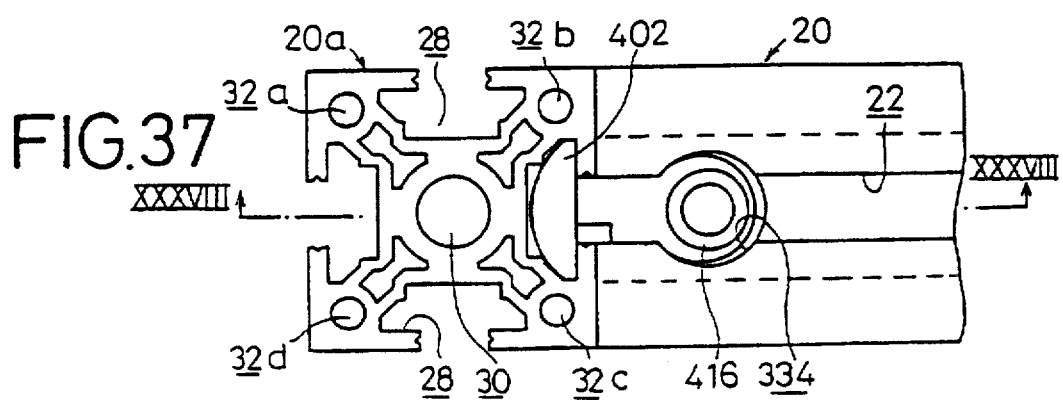
FIG. 37 is a side elevational view of structural members which are joined to each other by the joint mechanism shown in FIG. 36.

Then, the screw 388 is threaded into the internally threaded through hole 394 that is defined substantially centrally in the first engaging member 384. As the screw 388 is threaded in, the first engaging member 384 is angularly moved in the direction indicated by the arrow in FIG. 33, bringing the fingers 392 into abutment against the wall surfaces of the enlarged portion 26 of the slot 26, whereupon the first engaging member 384 is retained in the slot 22, as indicated by the broken lines in FIG. 33. When the screw 388 is further threaded in, the tapered tip end 387 of the screw 388 engages in the tapered recess 400 in the flat plate 398 (see FIG. 34), pressing a slanting surface of the tapered recess 400. As a result, the second engaging member 386 is displaced in the direction indicated by the arrow X by the pressing action of the tapered tip end 387. The structural member 20a is pulled in the direction indicated by the arrow X, and joined and fixed perpendicularly to the other structural member 20. As shown in FIG. 35, joint mechanisms according to the present embodiment may be mounted respectively on upper and lower surfaces of the structural member 20 to firmly join the structural members 20, 20a with increased rigidity.

FIGS. 36 through 39 show a joint mechanism for joining structural members according to another embodiment of the present invention. As with the two previous embodiments, the joint mechanism according to this embodiment is used to join the structural members 20, 20a substantially perpendicularly to each other.

The joint mechanism has a pair of engaging members 408a, 408b each having a substantially T-shaped head 402 and a tapered member 406 including an internally threaded through hole 404 and a tapered surface 405 which is progressively smaller in diameter. The joint mechanism also has a substantially cylindrical sleeve 410 interposed between the engaging members 408a, 408b. The sleeve 410 has a pair of opposite tapered surfaces 412 each inclined at a slightly smaller angle than the tapered surface 405, and a through hole 414 defined therein between the opposite tapered surfaces 412. A bolt 416 extends through the through holes 404 in the engaging members 408a, 408b and the hole 414 in the sleeve 410. The hole 414 in the sleeve 410 has a diameter greater than the diameter of the bolt 416.

For joining the structural members 20, 20a to each other, the heads 402 of the engaging members 408a, 408b are inserted from an end of the structural member 20a into one of the slots 22 therein. Then, the other structural member 20 is placed substantially perpendicularly to the structural member 20a, and the tapered members 406 of the engaging members 408a, 408b are inserted respectively into the substantially circular recesses 334 in the slots 22 defined respectively in the upper and lower surfaces of the structural member 20. The sleeve 410 is fitted in a through hole that is defined transversely in the structural member 20 between the slots 22, the through hole having a diameter corresponding to the diameter of the sleeve 410.

Figure 38:
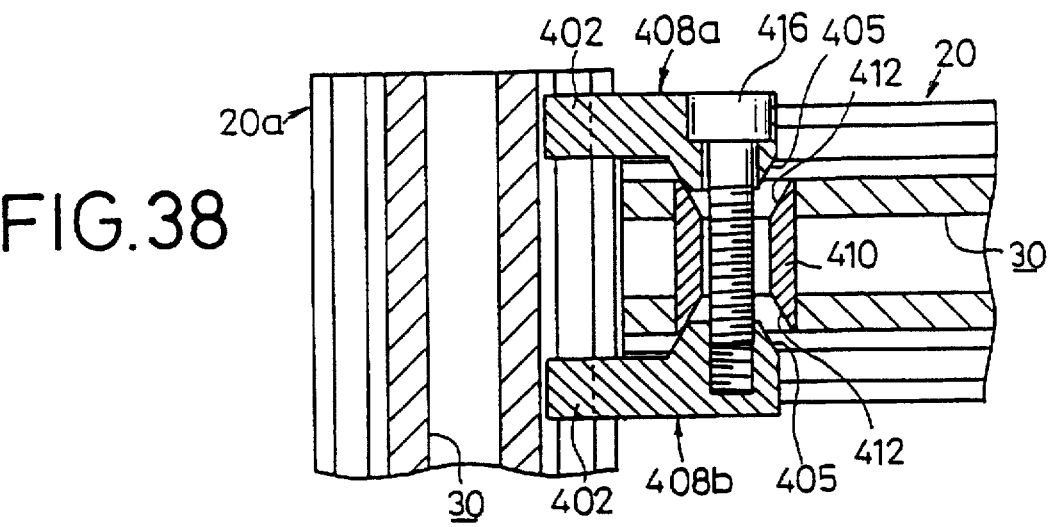
FIG. 38 is a cross-sectional view taken along line XXXVIII—XXXVIII of FIG. 37.
Figure 39:
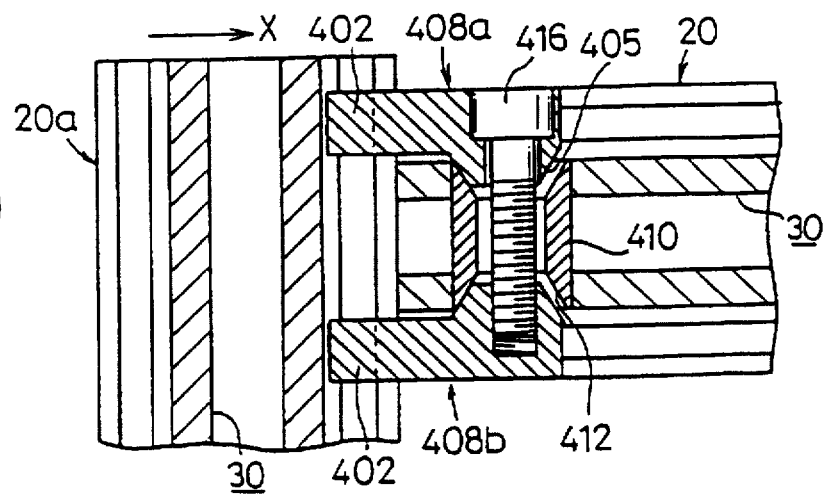
FIG. 39 is a vertical cross-sectional view of the joint mechanism as it is tightened from the condition shown in FIG. 38.

Then, the bolt 416 is inserted into the tapered members 406 of the engaging members 408a, 408b and the sleeve 410 (see FIG. 38). When the bolt 416 is threaded in, the tapered surfaces 405 of the engaging members 408a, 408b are drawn into the sleeve 410 along the tapered surfaces 412 thereof. As a consequence, the heads 402 of the engaging members 408a, 408b exert forces tending to pull the structural member 20a in the direction indicated by the arrow X, joining and fixing the structural member 20a to the other structural member 20 (see FIG. 39).

Figure 40:
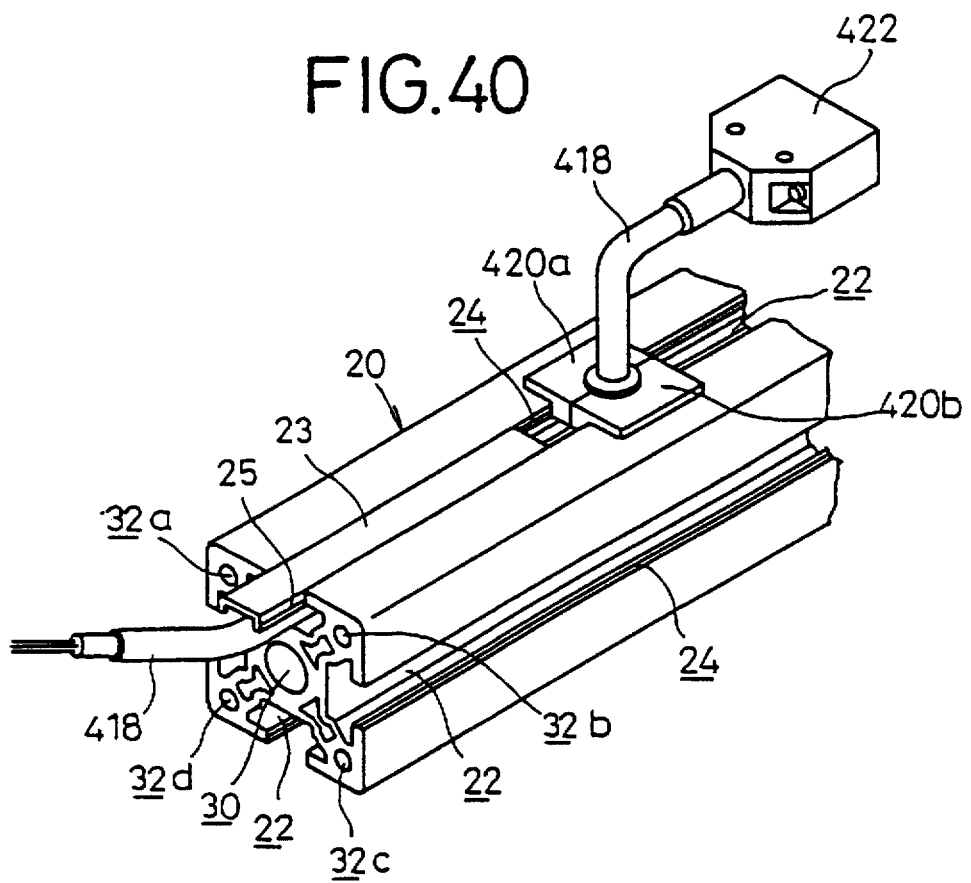
FIG. 40 is a perspective view of a structural member with a slot therein which is used as a wiring passage for a lead.

FIG. 40 shows the structural member 20 with a cover 23 of substantially channel-shaped cross section being mounted in one of the slots 22 which is used as a wiring passage for a lead 418.

A pair of locking members 420a, 420b for locking the lead 418 is mounted in the slot 22 in the structural member 20, and a connector 422 with a plurality of terminals is connected to an end of the lead 418.

The joint mechanisms according to the present invention offer the following advantages:

The passage communication member is used simply to keep the passage in one of the structural members in communication with the passage in the other structural member.

With the passages in the structural members being held in communication with each other by the passage communication member, the first engaging member inserted in the recess in one of the structural members and the second engaging member retained in the slot in the other structural member are coupled to each other by the fastening member. Therefore, the structural members can easily be joined and fixed to each other. Consequently, the period of time that is required to join the structural members is greatly reduced, and the efficiency with which the structural members are joined is increased.

Because the passage communication member and the first and second engaging members are simple in structure, they can be manufactured inexpensively on a mass-production basis.

Furthermore, one of the joint mechanisms according to the present invention allows the structural members to be joined to each other for angular movement about the shaft. It is possible to join and fix the structural members to each other as they have been angularly moved a desired angle about the shaft.

The first and second knuckles and the blocks can be attached to each other at a given angle established by the angle setting means. Therefore, the structural members can be joined and fixed to the each other as they have been twisted relatively to each other.

The joint mechanism may be connected to angularly movable members such as door hinges, for example, and the angularly movable members may be angularly displaced about the shaft.

According to the present invention, furthermore, the structural members can easily be joined to each other in line with or perpendicularly to each other by the first engaging member and the second engaging member which are of simple structure. The labor that is needed to join the structural members to each other can be reduced, the period of time that is required to joint the structural members to each other can be shortened, so that the efficiency of assembling the structural members can be increased.

INDUSTRIAL APPLICABILITY

The joint mechanisms for joining structural members according to the present invention may be used in a wide range of applications, e.g., to join structural members that are used in fluid pressure circuits and machines, components, apparatus, etc. which employ fluid pressure.

We claim:

1. A joint mechanism for joining together two structural members in abutting relationship to each other, each of said structural members having a slot defined in at least one side surface thereof and a longitudinally extending passage defined therein, comprising:

a passage communication member;

said passage communication member comprising a tubular body mounted in one passage defined in one of the structural members thereby retaining said tubular body in said one passage, and a head retained in the slot defined in the other of the structural members, said passage communication member further comprising a through hole defined therein extending through said tubular body and said head, said through hole keeping said one passage defined in one of the structural members and another passage defined in the other of the structural members in communication with each other, said passage communication member having dimensions such that said structural members abut each other when the passage communication member is fitted to both said structural members; and means for holding said structural members in abutment.

2. A joint mechanism according to claim 1, wherein said head includes a projection on an end thereof, said projection being fitted into a hole defined in the other of the structural members, said hole communicating with the passage defined in the other of the structural members.

3. A joint mechanism according to claim 2, further comprising a sealing member mounted on a surface of said head around said projection.

4. A joint mechanism according to claim 1, wherein said head includes a pair of flat surfaces defined on respective sides thereof, whereby said head can be inserted into said slot in one direction and then rotated for securing said head inside said slot.

5. A joint mechanism according to claim 1, wherein said tubular body includes an annular groove, and further comprising a seal disposed in said annular groove.

6. A joint mechanism according to claim 1, wherein said tubular body is mounted in said one passage on an end of said one of the structural members, and said head is mounted in the slot in the other of said structural members, said slot being defined in a side surface of the other of said structural members, whereby the end of said one of the structural members is held in said abutment against said side surface of the other of the structural members.

7. A joint mechanism according to claim 1, wherein means for holding said structural members in abutment comprises:

a first engaging member inserted in a recess defined in communication with the slot in said one of the structural members;

a second engaging member retained in the slot defined in the other of the structural members; and a bolt coupling said first engaging member and said second engaging member to each other.

8. A joint mechanism according to claim 7, wherein said first engaging member is disposed in said recess at a position adjacent an end of said one of the structural members, and said second engaging member is retained in the slot in the other of said structural members, said slot being defined in a side surface of the other of said structural members, whereby the end of said one of the structural members is held in said abutment against said side surface of the other of the structural members.

* * * * *